United States Patent [19]
Gaudreau et al.

[11] Patent Number: 6,043,636
[45] Date of Patent: Mar. 28, 2000

[54] VOLTAGE TRANSIENT SUPPRESSION

[75] Inventors: Marcel P. J. Gaudreau, Lexington, Mass.; Jean-Paul Dionne, Lapocatiere, Canada; Evgeny Holmansky, Acton, Mass.

[73] Assignee: Diversified Technologies, Inc., Bedford, Mass.

[21] Appl. No.: 08/954,637

[22] Filed: Oct. 20, 1997

[51] Int. Cl.[7] .............................. G05F 1/40; H02M 5/42
[52] U.S. Cl. ............................ 323/282; 323/285; 363/89
[58] Field of Search .................................... 323/282, 285, 323/222, 266; 363/54, 21, 89

[56] References Cited

U.S. PATENT DOCUMENTS

| | | | |
|---|---|---|---|
| 3,018,433 | 1/1962 | Stone, IV | 323/79 |
| 3,150,310 | 9/1964 | Ault | 323/22 |
| 3,160,807 | 12/1964 | Packard | 323/22 |

(List continued on next page.)

OTHER PUBLICATIONS

M.P.J. Gaudreau, "A Long Pulse, High Power Solid State Gyrotron Modulator—Diversified Technologies, Inc." Small Business Innovation Research Abstracts of Phase I Awards, U.S. Dept. of Energy, p. 91 (1991) No Month Available.

M.P.J. Gaudreau, "A Very High Power Solid State Modulator System for Fusion Systems—Diversified Technologies, Inc.", Small Business Innovation Research Abstracts of Phase I Awards, U.S. Dept. of Energy, pp. 42–43 (1989) Month Not Available.

Gaudreau et al., "Detailed Electrical Characterization of the Tara Neutral Beam Injector System", Nov. 1985 Proceedings of IEEE, 11th Symposium on Fusion Engineering, Austin, TX, vol. 1, No. 20, p. 187 (1986).

Levy et al., "Commercial Applications for Modulators and Pulse Power Technology", IEEE, Jul. 1992, pp. 8–14, 1992 Twentieth Power Modulator Symposium.

I. Nogradi, "Hardfet Modulator", IEEE, Jul. 1992, pp. 189–192, Twentieth Power Modulator Symposium.

R. Pastore et al., "Preliminary Evaluation of High Power Solid–State Switches for Electric Guns Applications", IEEE, Jul. 1992, pp. 281–284, 1992 Twentieth Power Modulator Symposium.

B. North et al., "Electrical Design and Operation of a Two–Klystron RF Station for the Los Alamos National Laboratory's Neutral Particle Beam Experiment", IEEE, Jul. 1992, pp. 15–18, 1992 Twentieth Power Modulator Symposium.

P. Robinson et al., "Compact Floating–Deck Modulator for HAX Transmitter", IEEE, Jul. 1992, pp. 41–44, 1992 Twentieth Power Modulator Symposium.

Venkatanarayana et al., "Diagnostic Techniques for On–Line Monitoring of High Speed Data in High Voltage Pulsed Power System", IEEE, Jul. 1992, pp. 72–75, 1992 Twentieth Power Modulator Symposium.

Pfeffer et al., "500 Kilowatt Solid–State Modulators for Fermillab's 400 MeV LINAC", IEEE, Jul. 1992, pp. 166–168, 1992 Twentieth Power Modulator Symposium.

(List continued on next page.)

*Primary Examiner*—Peter S. Wong
*Assistant Examiner*—Rajnikant B. Patel
*Attorney, Agent, or Firm*—Testa, Hurwitz & Thibeault, LLP

[57] ABSTRACT

A voltage transient suppression circuit includes a capacitor, a diode, and a voltage limiter. The negative terminal of the capacitor can be coupled to the negative terminal of a variable voltage circuit element (e.g., a switching device, a series impedance, or a load). The anode of the diode can be coupled to the positive terminal of the variable voltage circuit element, and the cathode of the diode is connected to the positive terminal of the capacitor. The voltage limiter is connected in parallel with the capacitor. When the voltage applied across the voltage limiter is above a predetermined voltage, current is allowed to conduct through the voltage limiter and a voltage potential drop across the voltage limiter is substantially independent of the current conducted therethrough. When the voltage applied across the voltage limiter is below the predetermined voltage, current is substantially prevented from passing through the voltage limiter.

20 Claims, 18 Drawing Sheets

U.S. PATENT DOCUMENTS

| | | | |
|---|---|---|---|
| 3,192,467 | 6/1965 | Baracket | 323/22 |
| 3,384,758 | 5/1968 | Kelley | 307/77 |
| 3,458,801 | 7/1969 | Polson | 323/21 |
| 3,500,172 | 3/1970 | Eckstein, Jr. | 323/9 |
| 3,551,788 | 12/1970 | Summer | 323/22 |
| 3,611,031 | 10/1971 | Lutz | 317/11 C |
| 3,761,799 | 9/1973 | Shuey | 323/4 |
| 3,892,977 | 7/1975 | Bierly | 307/77 |
| 3,956,687 | 5/1976 | Lindenman | 323/8 |
| 4,124,886 | 11/1978 | Black et al. | 363/121 |
| 4,217,618 | 8/1980 | Kellenbenz et al. | 361/56 |
| 4,271,448 | 6/1981 | Pond | 323/246 |
| 4,334,264 | 6/1982 | Knudsen | 363/51 |
| 4,400,660 | 8/1983 | Schaefer | 323/270 |
| 4,563,628 | 1/1986 | Tietz et al. | 320/20 |
| 4,594,634 | 6/1986 | Schminke | 361/93 |
| 4,665,458 | 5/1987 | Matsuoka et al. | 361/18 |
| 4,685,039 | 8/1987 | Inou et al. | 363/16 |
| 4,760,324 | 7/1988 | Underhill | 323/282 |
| 4,814,966 | 3/1989 | Ekstrand | 363/89 |
| 4,835,668 | 5/1989 | Palm et al. | 363/21 |
| 4,887,198 | 12/1989 | Lee | 363/18 |
| 4,893,070 | 1/1990 | Milberger et al. | 323/270 |
| 4,916,329 | 4/1990 | Dang et al. | 307/66 |
| 4,947,102 | 8/1990 | Eckstrand et al. | 323/293 |
| 4,999,760 | 3/1991 | Tietema | 363/53 |
| 5,155,673 | 10/1992 | Takahashi et al. | 363/54 |
| 5,327,333 | 7/1994 | Boulan et al. | 363/21 |
| 5,444,610 | 8/1995 | Gaudreau et al. | 363/54 |
| 5,515,257 | 5/1996 | Ishii | 323/282 |
| 5,646,833 | 7/1997 | Gaudreau et al. | 363/54 |

OTHER PUBLICATIONS

Archer Semiconductor Reference Guide, 1987 Edition, p. 11, Special Purpose Devices (Varistor) No Month.

M.P.J. Gaudreau, "Solid State Breakers for the Navy", Small Business Innovation Research Proposal, U.S. Dept. of Defense, Appendix B (1992).

M.P.J. Gaudreau, "A Long Pulse, High Power Solid–State Gyroton and Neutral Beam Modulator", Small Business Innovation Research Abstracts of Phase I Awards, U.S. Dept. of Energy, p. 39 (1992) No Month.

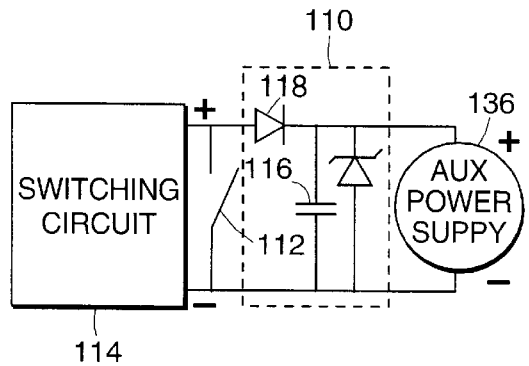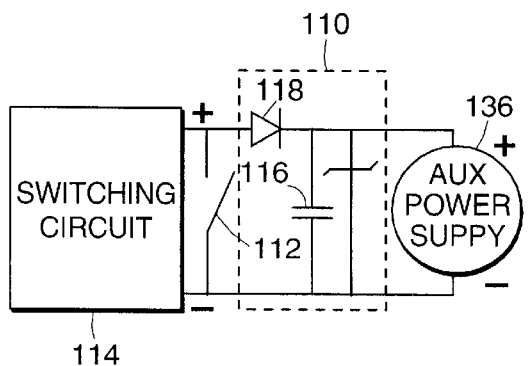
FIG. 18A     FIG. 18B
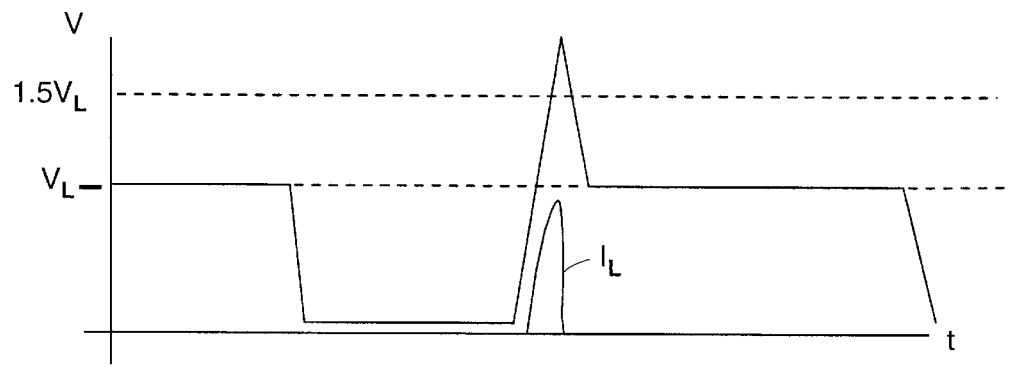
FIG. 19A
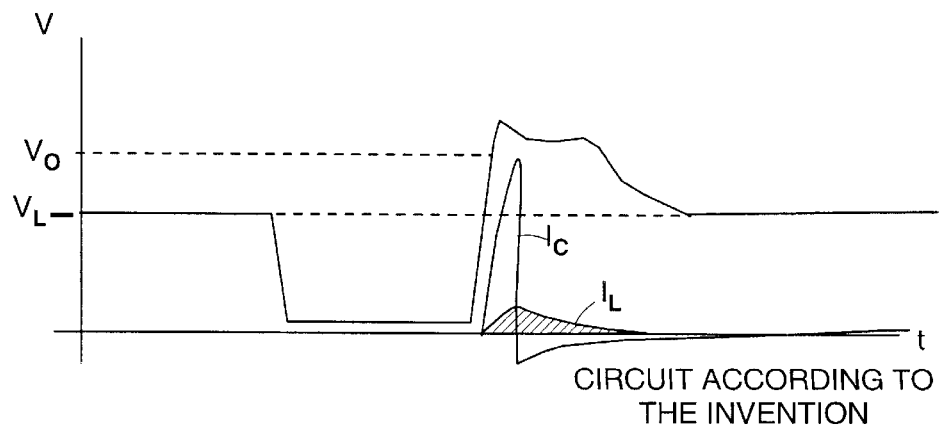
CIRCUIT ACCORDING TO
THE INVENTION
FIG. 19B

VOLTAGE TRANSIENT SUPPRESSION

CROSS-REFERENCE TO RELATED PATENTS

This application is related to U.S. Pat. No. 5,646,833, which was filed on Mar. 16, 1995 as U.S. patent application Ser. No. 08/405,370 and U.S. Pat. No. 5,444,610 which was filed on Oct. 22, 1993 as U.S. patent application Ser. No. 08/141,485. The entirety of U.S. Pat. Nos. 5,444,610 and 5,646,833 are incorporated herein by reference.

TECHNICAL FIELD

The present invention relates to overvoltage protection circuits and, in particular, to voltage transient suppression in high-speed switching circuits.

BACKGOUND INFORMATION

Power radio frequency devices that require high-voltage, high power, variable voltage sources with high frequency response and pulse-switching capabilities are known.

Switching-induced transient overvoltages are a common problem in high-speed, high power switching circuits, such as switching power converters and pulse modulators. Rapid current or voltage changes during commutation generates transient voltages because of the energy stored in circuit inductances and capacitances. In modern high-power switching circuits where current and voltage slew rates can reach 1–100 kA/$\mu$s and 10 to 1000 kV/$\mu$s, transient voltage spikes can be quite severe. A number of voltage transient suppression circuits and devices have been developed in an attempt to solve this problem.

It is known to use a capacitive snubber as a voltage transient suppression circuit. Three capacitive snubbers are shown in FIGS. 1A, 1B, and 1C. Although the operation of each of these snubbers differs slightly from the others, the method employed by all of the snubbers to suppress transient voltage is similar. The capacitor 114 is discharged during the ON state of the switching device 112. During ON/OFF transition, the capacitor 114 is being charged by absorbing the energy stored in circuit inductance. Stored energy dissipates during the next ON period in a resistor 116 or in the switch 112 itself.

In FIG. 1D, a simple capacitive snubber circuit for use in bridge-type power converters has switches 112, 112' that are alternately switched ON and OFF during every switching cycle. Capacitors 114, 114' are precharged to power supply voltage $V_0$ through resistors 116, 116', respectively. Diodes 118 and 118' prevent capacitors 114 and 114' from discharging through switches 112 and 112' during their ON state. During ON/OFF transition of each respective switch, the capacitor 114, 114' associated with that switch 112, 112' is being charged by absorbing the energy stored in circuit inductances. The charged capacitor 114, 114' is then discharged through the corresponding resistor 116, 116' and the power supply.

These snubber circuits, while generally able to limit voltage transients to a desirable level, have several disadvantages. For example, since the capacitor 114 is fully recharged every switching cycle, the circuits have a power dissipation in excess of $CV^2/2$ (for FIGS. 1A and 1C) or $CV^2$ (for FIG. 1B). This requires low-loss capacitors at high frequencies to account for the high charging and discharging currents. Another problem is that capacitor 114 discharge current flowing through the switch 112 increases current stresses and power dissipation in the switch 112. Also, switch ON time is critical for the circuits depicted in FIGS. 1B and 1C, since this time must be longer than the RC network time constant. The main drawback of the simple circuit of FIG. 1D is that it must be directly connected to the main power supply, and thus it cannot be used in high-voltage circuits having series-connected switches.

Referring to FIG. 2, a regenerative capacitive snubber stores energy in the capacitor 114 and then recovers that energy by feeding it back to the power supply instead of simply dissipating it. While this improves snubber efficiency, the amount of energy transferred remains equal to $CV^2/2$. Thus, high-power regeneration circuitry is necessary when operating the regenerative capacitive snubber at high power levels and switching frequencies.

Another type of voltage transient suppressers are non-linear impedance voltage-clamping devices such as transient absorbent Zener diodes 120 (FIG. 3A) and varistors 122 (FIG. 3B). Both devices have similar voltage-limiting characteristics (FIG. 4), but the two devices are based on different physical principles. When exposed to voltage transients, the impedance of the devices changes many orders of magnitude from a near open circuit to a highly conductive level, thus clamping the transient voltage to a safe level. The energy of the transient pulse is absorbed by the clamping device.

While transient absorbent Zener diodes 120 demonstrate satisfactory voltage clamping characteristics, very low current and power dissipation ratings make them unsuitable for power circuits. Varistors 122 have acceptable current ratings, but their power dissipation capabilities are marginal and therefore make them problematic for use in high-power, high-frequency inductive switching applications. Another drawback to using varistors 122 is their relatively high dynamic resistance, which leads to increased voltage rating requirements for switching devices and forces an increase in the number of series-connected devices in high-voltage circuits.

SUMMARY OF THE INVENTION

It is an object of the present invention to provide a voltage transient suppression circuit which is independent of switching circuit topology.

It is another object of the invention to provide a voltage transient suppression circuit having reduced power dissipation.

It is another object of the invention to provide a voltage transient suppression circuit having increased power dissipation capability.

It is a further object of the invention to provide a voltage transient suppression circuit which limits voltage across a switching device at a predetermined voltage level independent of voltage transient energy.

Yet another object of the invention is to provide a voltage transient suppression circuit which is constructed of cheap and rugged resistive components, has regenerative capabilities, applies no limitations to switching cycle, may be used in high voltage circuits with two or more series connected switching devices, and which provides voltage sharing in switching circuits having series connected switches.

In one aspect, the invention relates to a voltage transient suppression circuit which includes a snubber capacitance, a diode, and a voltage limiter. The negative terminal of the snubber capacitance can be coupled to the negative terminal of a variable voltage circuit element (e.g., a switching device, a series impedance, or a load). The anode of the diode can be coupled to the positive terminal of the variable voltage circuit element, and the cathode of the diode is connected to the positive terminal of the snubber capacitance. The voltage limiter is connected in parallel with the snubber capacitance. When the voltage applied across the voltage limiter is above a predetermined voltage, current is allowed to conduct through the voltage limiter and a voltage potential drop across the voltage limiter is substantially independent of the current conducted therethrough. When the voltage applied across the voltage limiter is below the predetermined voltage, current is substantially prevented from passing through the voltage limiter.

Embodiments according to this aspect of the invention can include a switching device as the variable voltage circuit element. With the switching device open, voltage across the snubber capacitance and across the switching device is substantially equal to the predetermined voltage. With the switching device closed, the diode is reverse biased, voltage across the switching device is substantially zero, and voltage across the snubber capacitance is substantially equal to the predetermined voltage. Alternatively, the variable voltage circuit element can be a series impedance or a load. Regardless of the form which the variable voltage circuit element takes, the voltage limiter can include a metaloxide varistor, a Zener diode, an isolated DC/DC power converter, or an active resistor (e.g., a series combination of a dissipating resistor and a switching device).

These and other objects, aspects, features, and advantages of the invention will become apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 18A is a schematic diagram of a voltage transient suppression circuit using a Zener diode varistor as a voltage-limiting means.

FIG. 18B is a schematic diagram of a voltage transient suppression circuit using a metal-oxide varistor as a voltage-limiting means.

FIG. 19A is a graph showing voltage transient waveforms for the conventional voltage transient suppression circuit shown in FIGS. 3A and 3B.

FIG. 19B is a graph showing voltage transient waveforms for a voltage transient suppression circuit according to the invention shown in FIGS. 18A and 18B.

DESCRIPTION

Figure 5A:
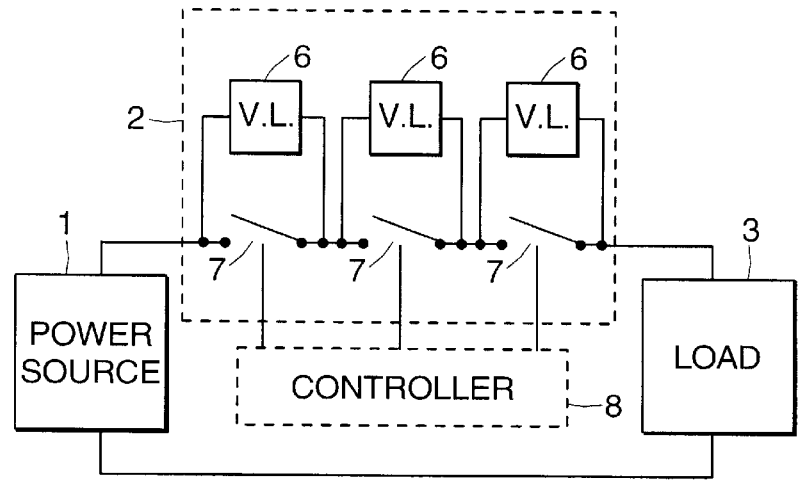
FIGS. 5A–5C are block diagrams of embodiments of a high voltage modulator.

Referring to FIG. 5A, a modulator 2 is connected between a power source 1 and load 3. The modulator 2 contains: a plurality of series connected voltage limiting means 6 connected in series with a load 3; a plurality of electrically controlled switches 7 connected in parallel with each voltage limiting means 6; and control means 8 connected to control inputs of switches 7.

Above a specified blocking voltage, significant current is conducted through the voltage limiting means 6 with a potential drop independent or slightly dependent of the current passing through. Below the specified blocking voltage, no significant current is conducted through the means 6. With switch 7 (which is connected in parallel with voltage limiting means 6) closed, a potential drop across a voltage limiting means is substantially zero.

Figure 6:
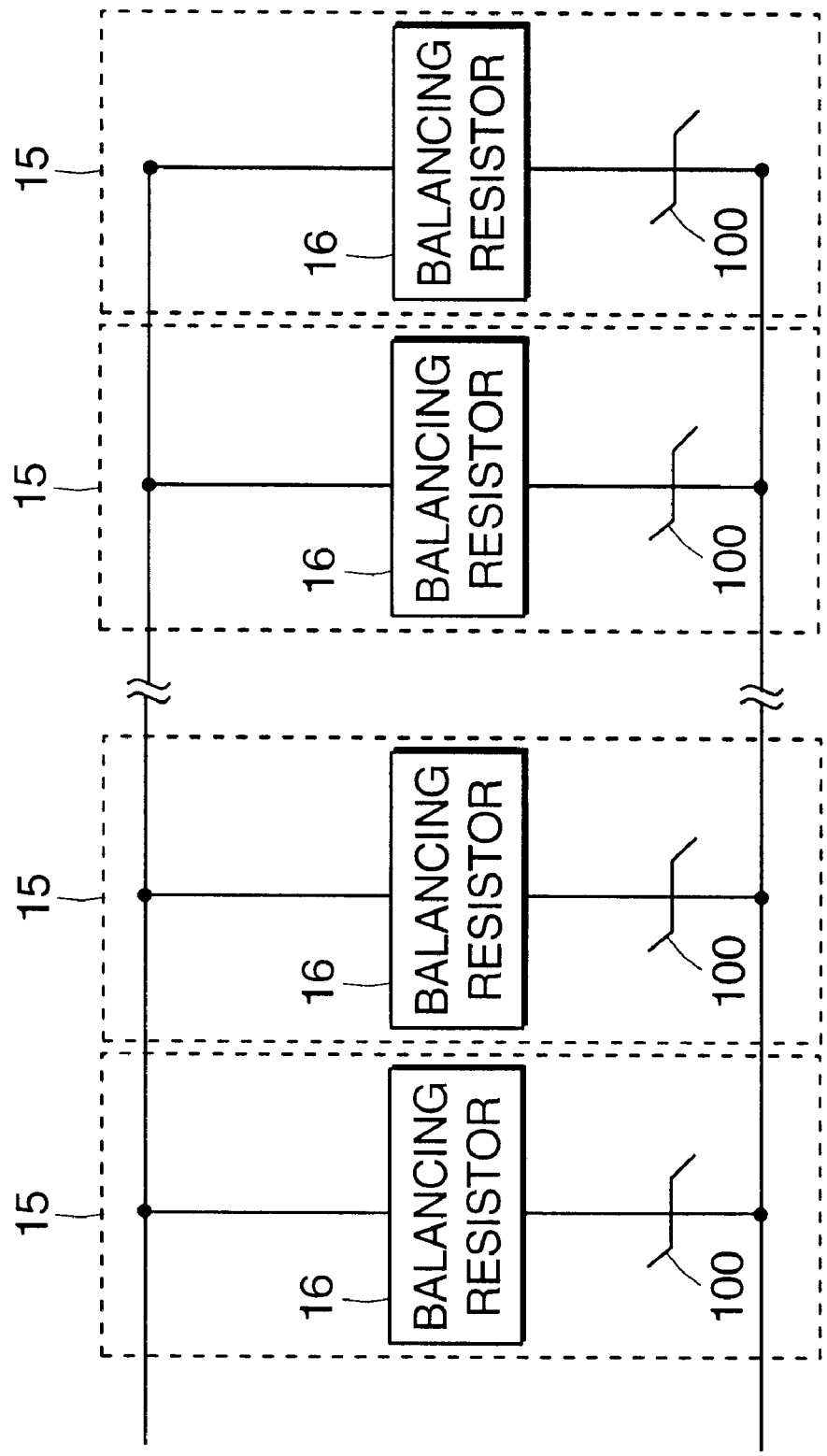
FIG. 6 is a schematic of a voltage limiting device using metal-oxide Varistors.
Figure 7:
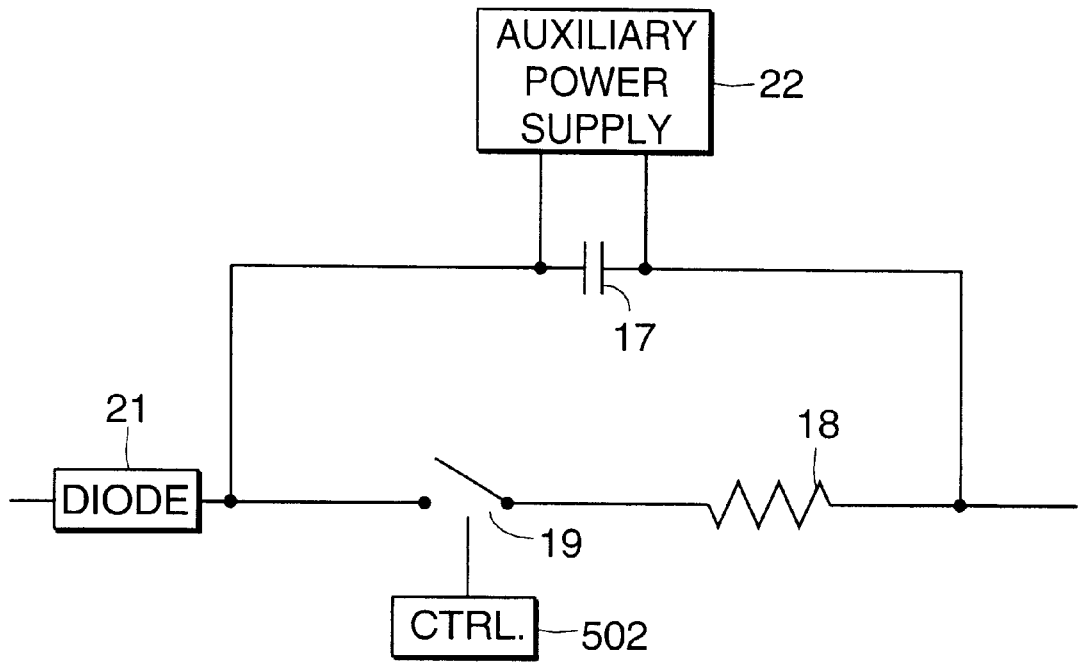
FIG. 7 is a schematic of a voltage limiting device using an active resistor.
Figure 8:
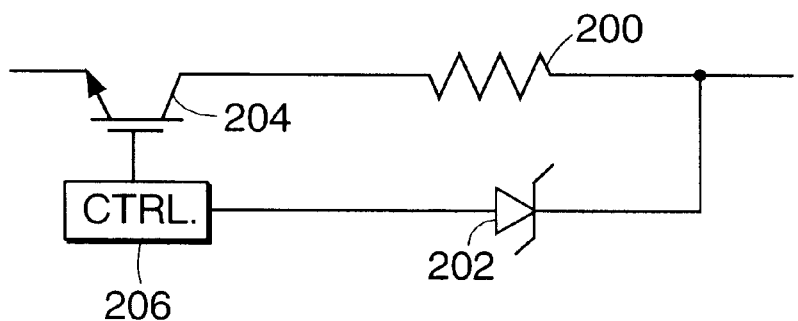
FIG. 8 is a schematic of a voltage limiting device using a Zener dissipater.

Three different embodiments for the voltage limiting means are presented in FIGS. 6, 7, and 8.

There are two different modes of operation of the modulator 2.

In the first mode, voltage of power source 1 applied to the modulator 2 is below the total blocking voltage of voltage limiting means 6. In this mode with all switches 7 open, full voltage of power source 1 will be applied to the modulator 2 and no significant current will be conducted through the load 3. With all switches closed, current will pass through the modulator 2 with a fairly low voltage drop, and full voltage will be applied to the load 3. This mode represents a current interruption flnction of the modulator 2. For providing "soft" current interruption, switches 7 are switched from the open to close state one by one, hence voltage limiting means 6 are shorted one by one with switches 7; total blocking voltage of the modulator 2 decreases stepwise, and voltage applied to the load 3 increases respectively. In the end of the conduction phase, the switches 7 are switched from close to open state one by one, total blocking voltage of the modulator 2 increases stepwise, and voltage applied to the load 3 decreases from full voltage to zero.

In the second mode, voltage of power source 1 applied to the modulator 2 is above the total blocking voltage of voltage limiting means 6. In this mode a ratio of switches 7 being in close and open states determines the total potential drop of the modulator 2 and hence, determines the voltage applied to the load 3, thereby providing voltage modulation or regulation in discrete steps. By appropriate order of switching voltage limiting means 6 with different blocking voltages, very high resolution of modulation or regulation can be achieved.

Figure 5B:
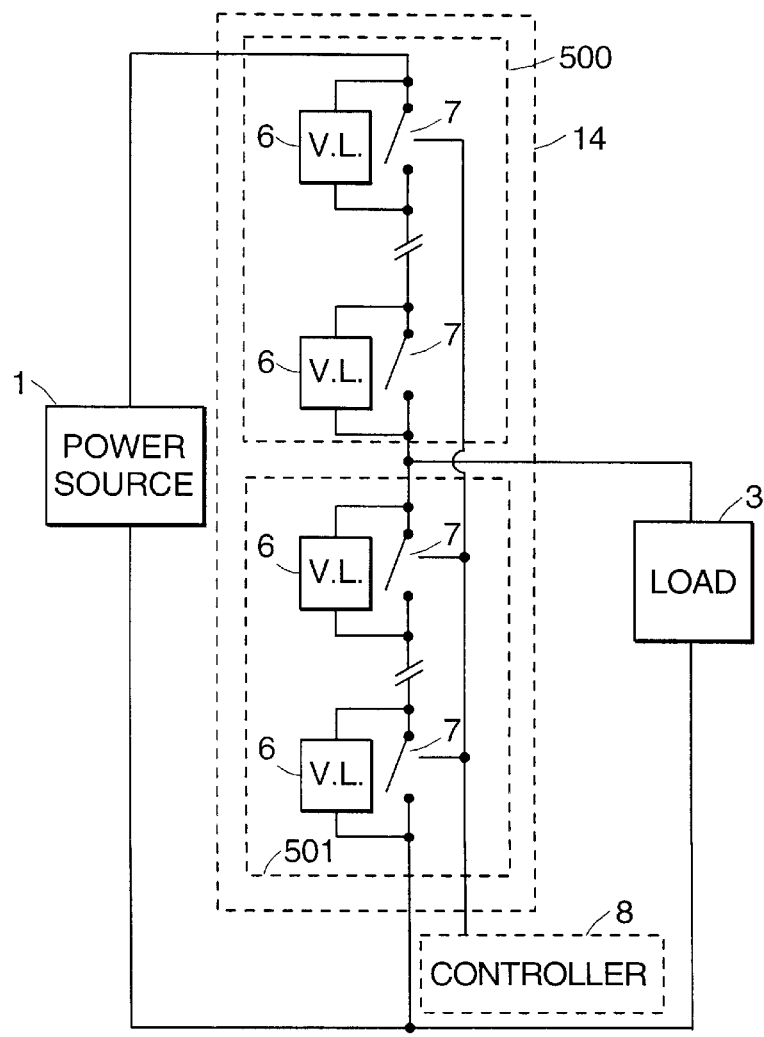

Referring to FIG. 5B, a modulator 14 is shown connected to a power source 1. The modulator 14 contains two series connected networks 500 and 501 of series connected voltage limiting means 6 and electrically controlled switches 7, connected in parallel with some of voltage limiting means 6. While each voltage limiting means 6 is shown having a switch 7 it is possible that some voltage limiting means 6 do not have a switch 7 associated therewith. Also, if network 501 includes one or more means 6 and/or switches 7, network 500 may not be needed. Load 3 is connected in parallel with one of these networks. Control means 8 is connected to control inputs of switches 7. Similar to the modulator 2 of FIG. 5A, a ratio of switches 7 in close and open states determines the total potential drop of modulator 14 and hence, determines the voltage applied to the load 3, thereby providing voltage modulation or regulation in discrete steps. By appropriate order of switching voltage limiting means 6 with different blocking voltages, very high resolution of modulation or regulation can be achieved.

This configuration has the advantage that the voltage on the load 3 can be forced ON by one network and forced OFF by the other network.

Figure 5C:
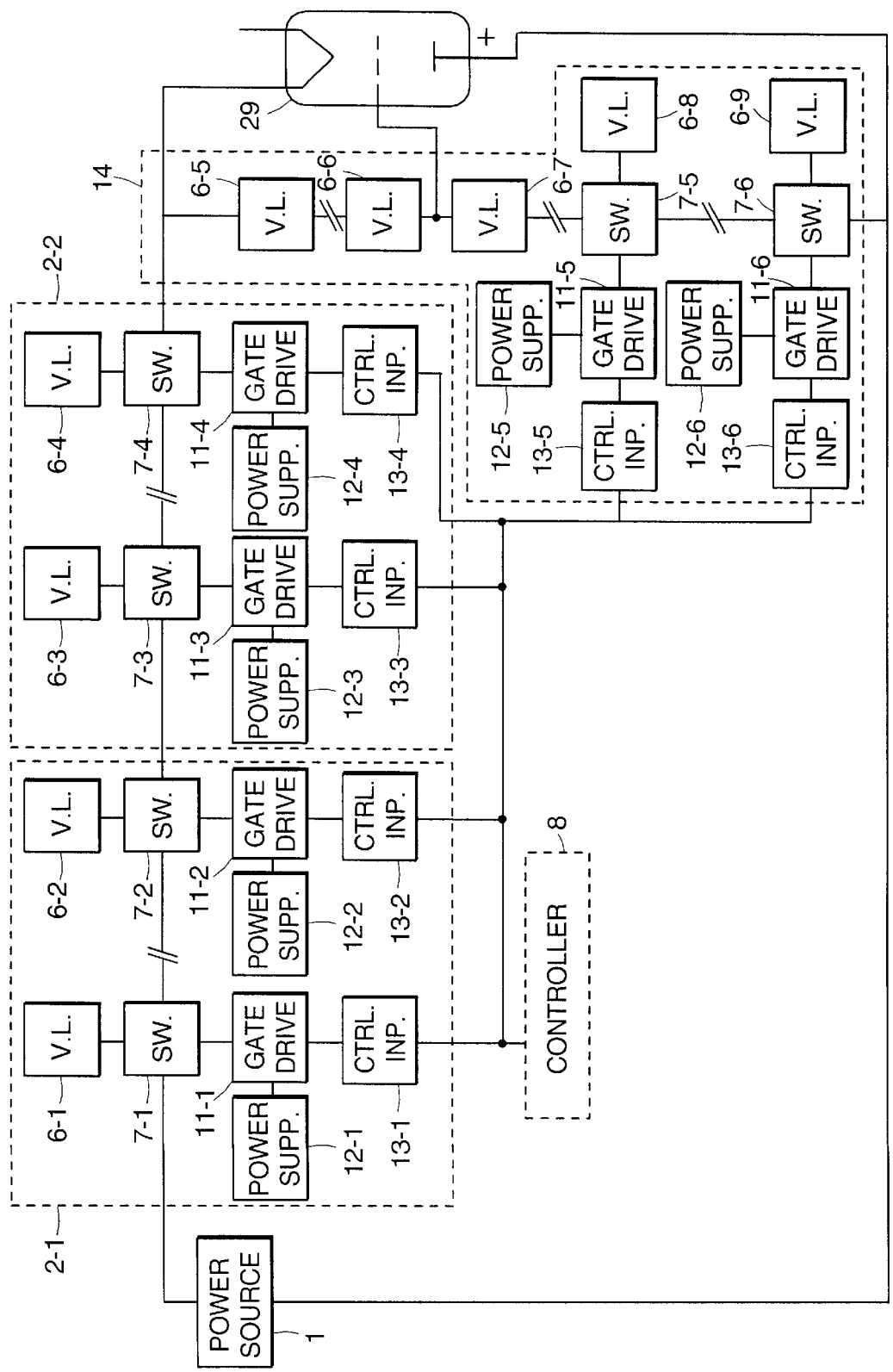

Referring to FIG. 5C, in one embodiment, three modulators 2-1, 2—2, and 14 are shown with a gyrotron load 29. Modulators 2-1 and 2—2 comprising voltage limiting means 6-1 through 6-4 and parallel connected switches 7-1 through 7-4 are shown connected between power source 1 and gyrotron 29. Other loads are possible as mentioned elsewhere. Modulator 14 comprising voltage limiting means 6-5 through 6-9 and parallel connected switches 7-5, 7-6 is shown connected in parallel to the gyrotron 29 and the gyrotron's grid is connected in parallel with the first network of the series connected voltage limiting means 6-7 through 6-9. Switches 7-1 through 7-6 are switched ON and OFF by control means through control inputs 13-1 through 13-6 gate drives 11-1 through 11-6 with power supplies 12-1 through 12-6.

Modulator 2-1 has a total blocking voltage higher than the voltage of power source 1 and performs the function of an enable switch, providing current interruption. Modulator 2—2 has a total blocking voltage lower than the voltage of the power source 1 and performs the function of voltage modulation and regulation. Modulator 14 performs the function of active voltage divider, supplying bias voltage for the gyrotron's grid.

Referring to FIG. 6, in one embodiment the voltage limiting means 6 includes one or more parallel groups of metal-oxide varistors (MOVs) 15. Each parallel group contains one or more MOVs 100 connected in series. When the number of parallel groups is more than one, each group contains a balancing resistor 16 connected in series with the MOVs 100. The number of MOVs 100 in every group is chosen so that the total blocking voltage of all the MOVs 100 connected in series is equal to the desired blocking voltage of the voltage limiting means 6. The number of parallel groups is chosen so that the total maximum current of all groups connected in parallel is equal to or more than the maximum load current.

When the voltage is higher than the blocking voltage applied to the voltage limiting means 6, all MOVs 100 conduct current. The total current passing through the MOVs 100 is equal to the load's current; the total potential drop is only slightly dependent on passing current and is equal to the total blocking voltage of all MOVs 100 connected in series. The potential drop in the balancing resistors 16 depends on the current flowing in each parallel group 15 and compensates differences in the blocking voltage of the MOVs 100 so that the current flowing through each parallel group 15 is approximately the same.

In this embodiment, the resistor 16 is only one of many possible realizations of balancing devices.

Referring to FIG. 7, in another embodiment, the voltage limiting means 6 includes a capacitor 17 connected in parallel with a series combination of a dissipating resistor 18 and switch 19. A diode 21 is connected in series with the parallel network of the capacitor 17, the resistor 18, and switch 19. The polarity of the diode 21 connection depends on the polarity of the load current. An auxiliary power supply 22 is connected in parallel with capacitor 17. The polarity of the power supply 22 connection depends on the polarity of the load current.

When the switch 19 is open, the capacitor 17 is charged at a rate defined by the load current and the switch off-time. Similarly, when the switch 19 is closed, the capacitor 17 is discharged through the resistor 18. Control means 502 maintains voltage across the capacitor 17 is controlled by the open/close time of the switch 19 so that this voltage is independent of current, passing through the voltage limiting means. By varying a reference voltage of the control means 502, variable voltage across the capacitor 17 can be obtained. The diode 21 prevents the capacitor 17 from discharging when switch 19 is closed.

In this embodiment, the diode 21 is only one of many possible realizations of discharging protecting devices. The auxiliary power supply 22 is not always necessary, it pre-charges the capacitor 17 in the beginning of the working cycle to make the capacitor's charging time independent of the load current.

Referring to FIG. 8, in another embodiment of the voltage limiting means 6, a Zener dissipater includes a dissipating resistor 200 a voltage reference device 202 and a regulating device 204. The dissipating resistor 200 and the regulating device 204 are connected in series. The voltage reference device 202 is connected to the input of the regulating device 204.

The voltage across the voltage reference device 202 is measured by the control means 206 and the voltage across the regulating device 204 is changed so that the voltage across the resistor 200 and the regulating device 204 is always proportional to the reference voltage, regardless of the current flowing.

In this embodiment, the dissipating resistor 200 is not always necessary, it is used only for improved power dissipation. A bipolar transistor, an insulated gate bipolar transistor (IGBT), or a metal oxide semiconductor field effect transistor (MOSFET) can be used as a regulating device 204. For a voltage reference device 202, a Zener diode or metal oxide varistor (MOV) can be used.

Figure 9:
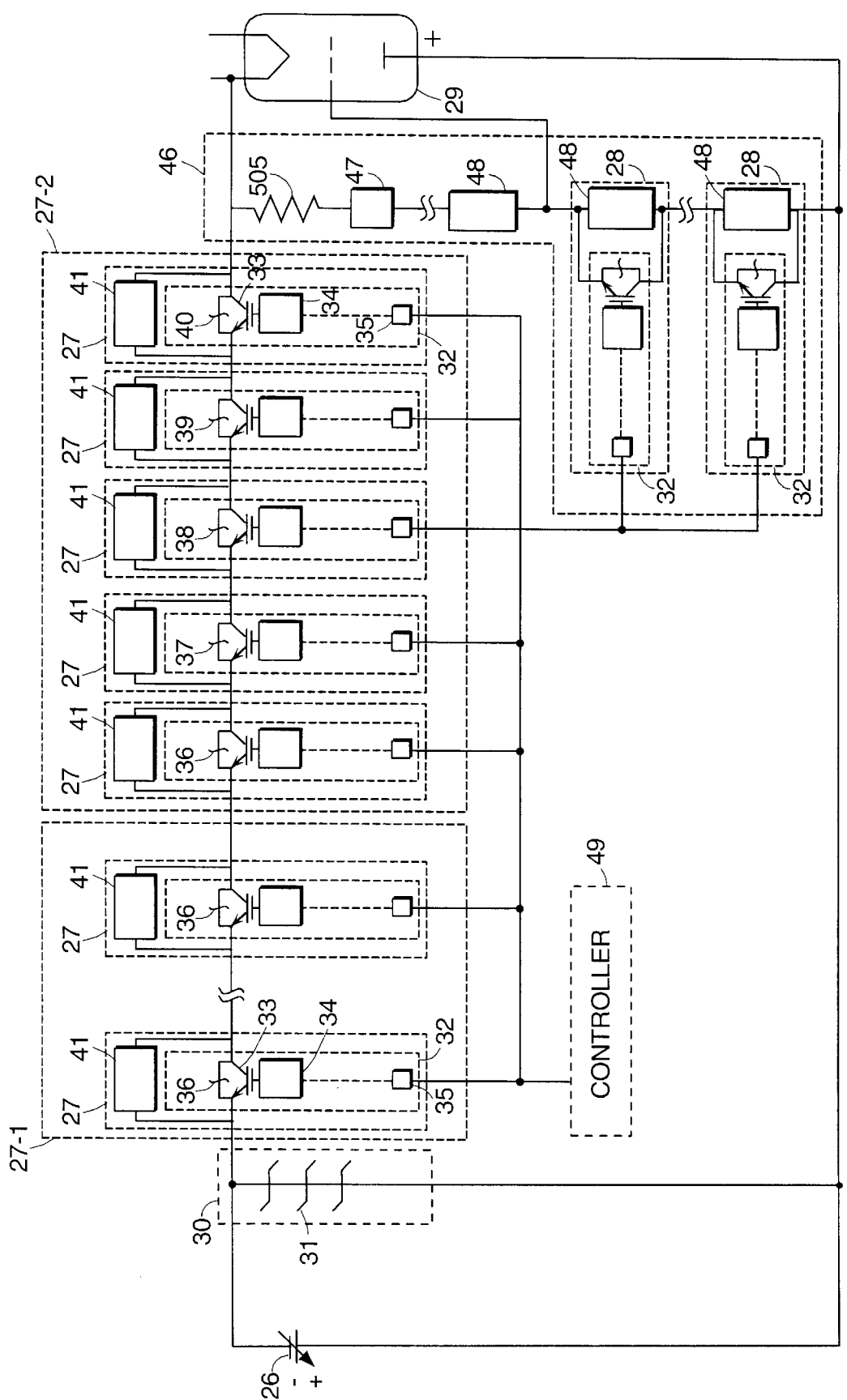
FIG. 9 is a schematic of the modulator applied to a gyrotron load.

Referring to FIG. 9, one embodiment of a modulator can be used for gyrotron 29 control. In this embodiment, an enable switch 27-1 and a ladder of dissipater modules 28, connected in series, are connected between a high voltage power source 26 and a load 29 (in this case, the gyrotron). A surge suppresser 30, which includes a stack of MOVs 31, is connected in parallel to the power source 26.

The enable switch 27-1 includes a ladder of switch modules 32.

The switch modules 32 are based on an IGBT switch 33. The gate of the IGBT switch 33 is connected to a control means 49 through an insulated control input 35 and a gate drive 34 with embedded insulated power supply. The surge suppresser MOVs 36 are connected in parallel with the switch modules 32.

The dissipater modules 28 include switch modules 32 connected in parallel with the MOVs 36, 37, 38, 39 or 40, which perform the functions of both the voltage limiting means and a snubber. A MOV in each dissipater module 28 has a decreasing binary fraction of the unit blocking voltage. The first module has a unit blocking voltage MOV 36 in parallel with the switch 33. The second module has a one-half blocking voltage MOV 37. The third module has a onequarter blocking voltage MOV 38. The fourth module has a one-eighth blocking voltage MOV 39. The fifth module has a one-sixteenth blocking voltage MOV 40.

Heat dissipation means 41–45 are connected in parallel with the switch modules 32. The heat dissipation means 41 has a unit blocking voltage, and 42, 43, 44 and 45 have one-half, one-quarter, one-eighth and one-sixteenth blocking voltage respectively. The heat dissipation means can have a structure similar to that shown in FIG. 6, with the exception that a fuse is also placed in series with each parallel group of MOVs.

A variable active voltage divider 46 is connected to the output of the modulator 27-2 in parallel with the load 29. The active divider include MOVs 47, 48 with different blocking voltage, connected in series. The switch modules 32 are connected in parallel with some MOVs 48. The tap of the voltage divider is connected to the gyrotron's grid. A resistor 505 can be implemented to reduce power dissipated by means 46.

Referring to FIG. 9, the operation of the modulator gyrotron control is as follows. The power source 26 applies high voltage to the modulator. For a gyrotron the polarity of the supply is negative.

The surge suppresser 30 prevents voltage spikes higher than the blocking voltage of the enable switch 27 from being applied to the modulator.

IGBT switches 32 in enable switch 27-1 are switched ON and OFF by control means 49 through control inputs 35 and gate drives 34. When enable switch 27-1 is OFF, full voltage of the power source 26 is applied to the switch, preventing current from passing through gyrotron 29. When the enable switch is ON, current passes through the enable switch 27-1 with a fairly low voltage drop, and full voltage of the power source is applied to the dissipater modules 28 and the gyrotron 29.

Dissipater modules 28, unlike enable switch 27-1, must often carry high current even when switched off, yet still maintain their fill blocking voltage. The power that must be dissipated in this case is too high for the heat sinking capabilities of MOVs 36 through 40. Dissipater modules 41 through 45 are placed in parallel with each switch module. Each dissipater module has a structure shown in FIG. 6, with one exception: a fuse is also placed in series with each parallel group of MOVs to prevent one faulty MOV from shorting out the whole stack. Any number of MOVs can be placed in parallel in this manner, allowing arbitrarily high power dissipaters.

If voltage higher than the blocking voltage is applied to dissipater module 28 with switch 32 open, current is conducted by heat dissipation means 41 through 45 and the power of the blocking voltage is dissipated by the heat dissipation means. With the switch 32 closed, current is conducted by switch 32 with very small voltage drop across the switch 32.

Control means 49 determines the order of switching ON and OFF the switches 32 in dissipater modules 28, providing voltage modulation in discrete, relatively small steps. This embodiment shows, a group of five dissipater modules of unit 41, one-half 42, one-quarter 43, one-eighth 44, and one-sixteenth 45 blocking voltages that could be controlled in a binary fashion. For example, 1000V, 500V, 250V, 125V and 62.5V dissipater modules could control voltages from 0V to 2kV in 62.5V steps. By controlling which modules are switched, linear voltage modulation can be simulated by discrete steps.

The order of switching switch modules 32 in active divider 46 is determined by control means 49 so that the voltage of the active divider's tap is equal to the required voltage of the load's tap.

Figure 10:
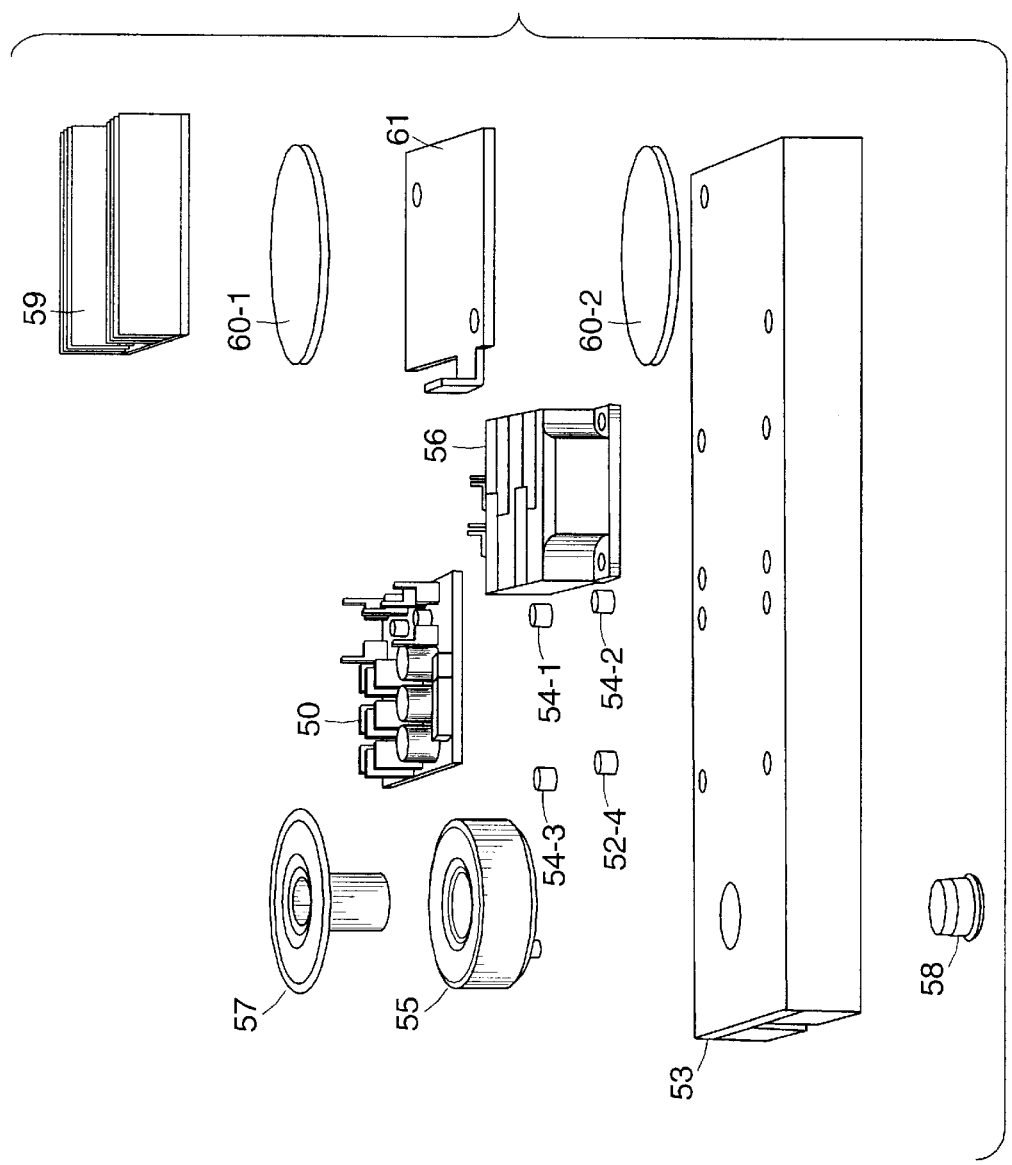
FIG. 10 is an exploded view of a dual switch module.

Referring to FIG. 10, a dual switch module includes a dual gate drive 50 bolted to a main switch module heat sink 53 with standoffs 54-1 to 54-4 between the two. In this embodiment, dual gate drive 50 receives power from the secondary of an isolation transformer 55. The isolation transformer 55 is attached to the main switch module heat sink 53. The isolation transformer has an upper corona shield 57 and a lower corona shield 58. The dual gate drive 50 outputs to the gates of a dual IGBT 56. The free collector of dual IGBT 56 is connected to an upper switch module heat sink 59. The upper switch module heat sink 59 rests on the MOV 60-1. This MOV 60-1 in turn rests on an MOV separator heat sink 61. The MOV separator heat sink 61 is attached to the common emitter/collector of the dual IGBT 56. The MOV separator/heat sink 61 rests on another MOV 60-2, which rests on the main switch module heat sink 53. The main switch module heat sink 53 is connected to the free emitter of dual IGBT 56. The entire MOV/heat sink assembly is bolted together using insulating bolts.

Figure 11:
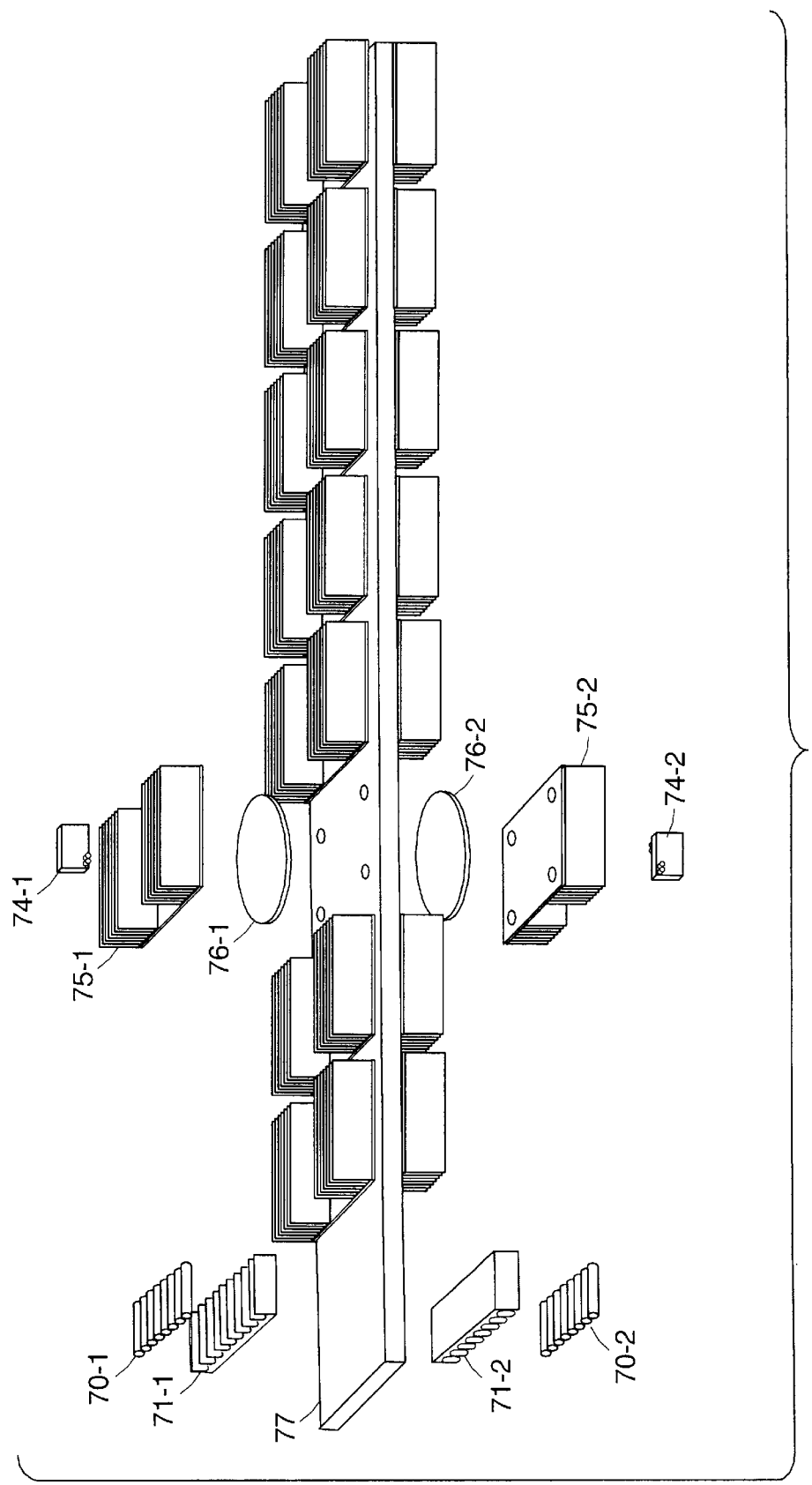
FIG. 11 is an exploded view of a dual dissipater module.

Referring to FIG. 11, in a dual dissipater module fuses 70-1 are placed in fuse holders 71-1. In the upper dissipater module, each fuse 70-1 is connected to the free collector of the dual IGBT 56, FIG. 10. In the lower dissipater module, each fuse 70-2 is connected to the free emitter of the dual IGBT 56. Each fuse 70-1, 70-2 is then connected in series to an individual balancing resistor 74-1, 74-2 the balancing resistor 74-1, 74-2 are connected in series to a dissipater MOV heat sink 77. The dissipater MOV heat sink 77 is connected in series with MOVs 76-1, 76-2. The MOVs 76-1, 76-2 are connected to a dissipater mounting bar/heat sink 77. Dissipater mounting bar/heat sink 77 is connected to the common collector/emitter of the dual IGBT 56. The heat sink/MOV assemblies are bolted to dissipater mounting bar/heat sink 77 using insulating material.

The specific embodiments for mounting and heat sinking as well as the physical location and attachment of heat sinks and other module components are unimportant to the nature of the invention.

The IGBTs shown in this embodiment of the modulator are only one type of semiconductor switch that could be used as a basis for the switch modules. Other possible choices for semiconductor switches include Field Effect Transistors (FETs), Metal Oxide Controlled Thyristors (MCTs), Gate Turn Off Thyristors (GTO), and Power Darlingtons.

The number of binary fraction or unit blocking voltage modules represented is only one embodiment; many other arrangements are possible. Any number of switch modules can be placed in series in the enable switch to arbitrarily high blocking voltages, with prior isolation. Similarly, any number of switch modules in the main modulator can be placed in series, each with any arbitrary blocking voltage. Any linear, binary, or both linear and binary segments of blocking voltages are possible, with an appropriate control means. Very high resolutions are possible, depending on how many dissipater modules are used. The number of parallel MOVs in a dissipater module depends only on the maximum current required and pulse length, and any number is possible.

Figure 12B:
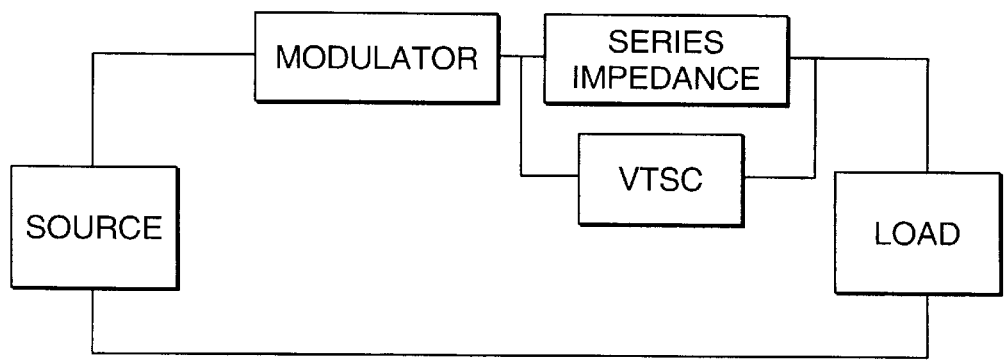
FIGS. 12A and 12B are block diagrams of modulators in overcurrent protection device (circuit breaker) applications.
Figure 12A:
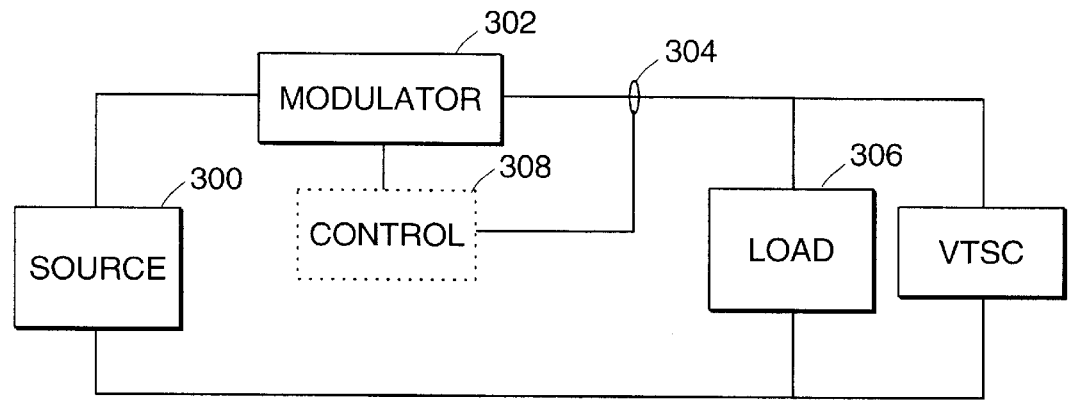

The modulator also can be used as a commutation element in various switching applications. Use of the modulator with conventional structures allows the conventional structure to operate at much higher voltage (1kV to 2MV). Examples of such usage are, shown in FIGS. 12A, 12B, 13, and 14. FIG. 12A presents the modulator 302 in an overcurrent protection device (e.g., a circuit breaker). The modulator 302 is connected in series between the source 300 and the load 306. A control means 308 turns OFF the modulator when an overcurrent is detected by the current sensor 304 or when the power supply need to be disconnected from the load. The control means 308 turns ON the modulator when the power supply needs to be connected to the load.

Figure 13:
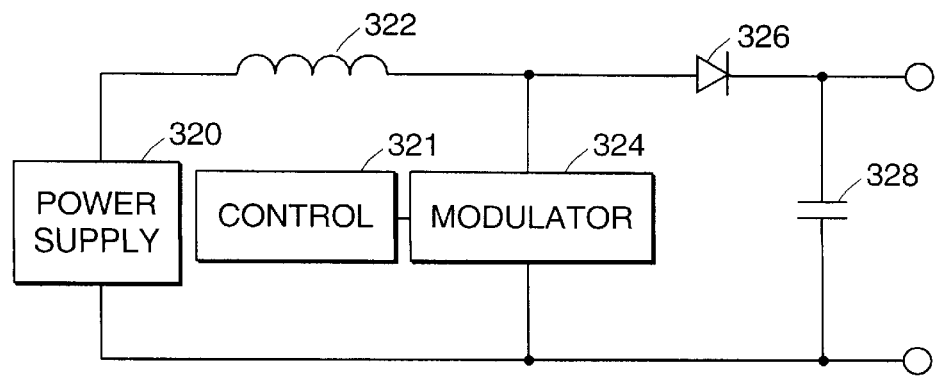
FIG. 13 is a block diagram of a modulator in a boost converter application.

FIG. 13 presents the modulator 324 in a boost converter configuration. The control means 321 turns ON and OFF the modulator 324. When the modulator is ON, the power supply 320 forces current in the inductance 322, and when the modulator is OFF the inductance charges the capacitor 328 through the diode 326.

Figure 14:
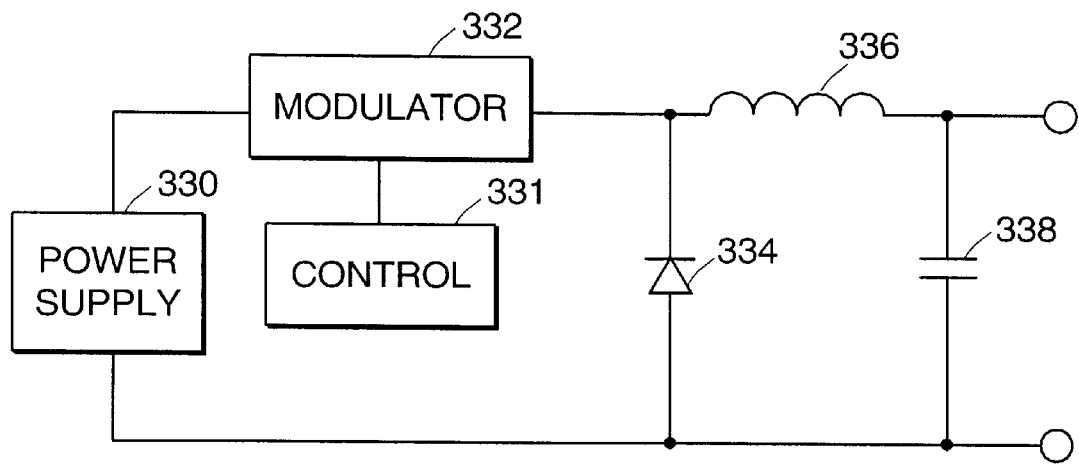
FIG. 14 is a block diagram of a modulator in a buck converter application.

FIG. 14 presents a buck converter. The modulator 332 controls the energy transfer to the inductance 336 and capacitor 338 network from the power supply 330. The diode 334 creates a path for the inductance 336 current when the modulator 332 is off. The control means 331 determines the modulator's turn ON and OFF time.

Figure 15:
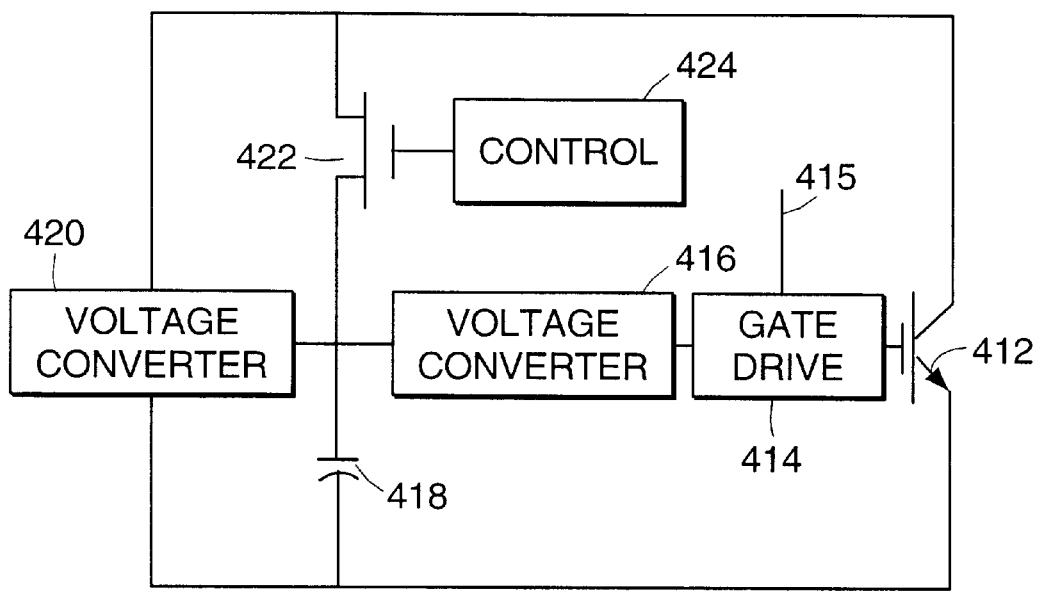
FIG. 15 is a block diagram of an apparatus for providing power to a gate drive of a solid state power switch.

Referring to FIG. 15, an apparatus for providing power to a gate drive of a solid state power switch include a high voltage for example 1000V to low voltage for example 3V converter 420 connected in parallel with a solid state switch 412. Its low voltage output is connected to the low voltage input of the second converter 416. The outputs of the second converter 416 supply power for the gate drive 414 connected to the control input of the solid state switch 412, and for the control means 424, connected to the control input of high voltage low current switch 422. Low voltage input of the second converter 416 is also connected in parallel with solid state switch 412 through high voltage switch 422. Storage capacitor 418 is connected in parallel with the low voltage input of second converter 416. Optical link 415 provides the control signal to gate drive 414.

When solid state switch 412 is open, high voltage across the switch is converted by first converter to a low voltage. Second converter 416 converts this voltage to the control voltage, which is necessary for the gate drive 414. High voltage switch 422 is disabled by control means 424, protecting second converter 416 from the high voltage.

When power switch 412 is closed, voltage across it is about 2 to 3 volts, and this voltage is insufficient for normal operation of first converter 420. High voltage switch 422 is enabled by control means 424 and second converter 416 receives power through closed switch 422, supplying control voltage to the gate drive 414. Thus, gate drive 414 receives power continuously, independent of the state of power switch 412.

The above description makes it clear that a modulator can perform switching and linear modulation functions at high speed while requiring minimal support equipment and protection circuitry, being small and easy to maintain, relatively inexpensive, and insensitive to environmental conditions and changes. The modulator can be used for voltages and currents far beyond those of known modulators. The modulator can be air, gas, epoxy, or oil insulated depending on the application.

In many embodiments, it is desirable to control voltage transients induced in the circuit when each switch 7 opens or closes. Each switch 7 may be provided with its own transient suppression circuit, or one suppression circuit may be provided for a plurality of series-connected switches. A description of voltage transient suppression circuits and techniques according to the invention follows.

Figure 16:
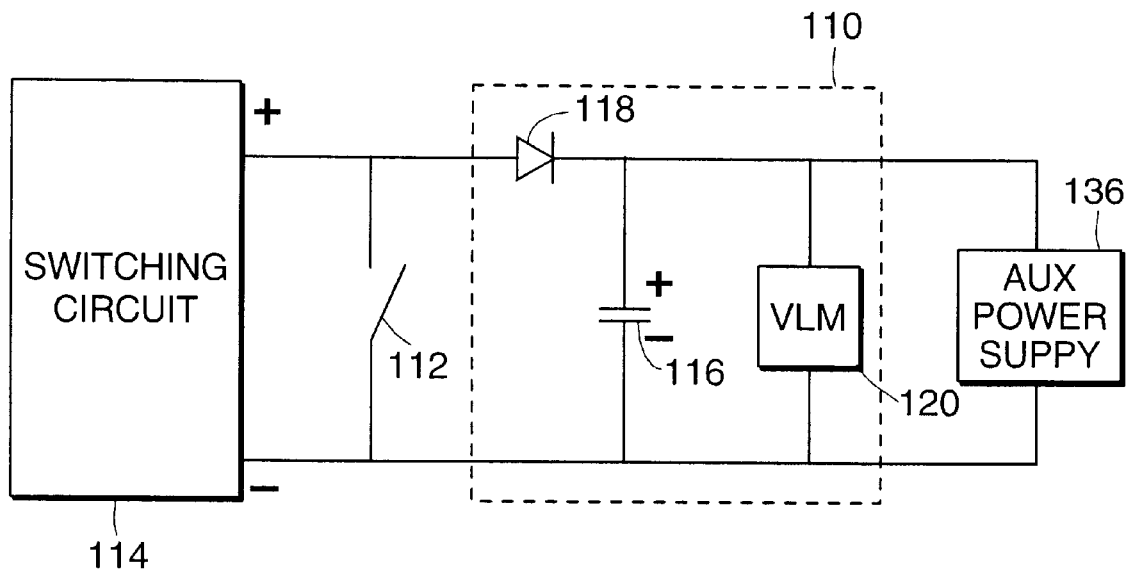
FIG. 16 is a schematic diagram of a voltage transient suppression circuit according to the invention.

An embodiment of a voltage transient suppression circuit according to the present invention is illustrated in FIG. 16. The voltage transient suppression circuit 110 of FIG. 16 is connected to a switching device 112 being protected by the circuit 110. In alternate embodiments, the circuit 110 is not placed across the switch 112 but instead across other types of variable voltage circuit elements such as a load or a series impedance. A voltage transient suppression circuit (VTSC) according to the invention (embodiments of which are described hereinafter with reference to FIGS. 16–23) can be located in various places. In general, a VTSC can be located across any variable voltage circuit element such as a load, a series impedance, or a switching device. For example, as shown in FIG. 12A, a VTSC is disposed across the load to limit overvoltage on the load. In FIG. 12B, a VTSC is placed in parallel with a series impedance to regenerate energy that otherwise would be lost in the series impedance. The otherwise-lost energy can be due to, for example, faults or large turn-on and/or turn-off transients. Such transients can occur in, for example, plasma source ion implantation systems. In FIG. 16, the switching device 112 is a part of an arbitrary switching circuit 114. Voltage transient suppression circuit 110 includes a clamp capacitor 116 connected in parallel with switching device 112 through diode 118. The anode of diode 118 is connected to the positive terminal of switching device 112, while its cathode is connected to the positive terminal of capacitor 116. Voltage limiting means 120 is connected in parallel with clamp capacitor 116.

Figure 17:
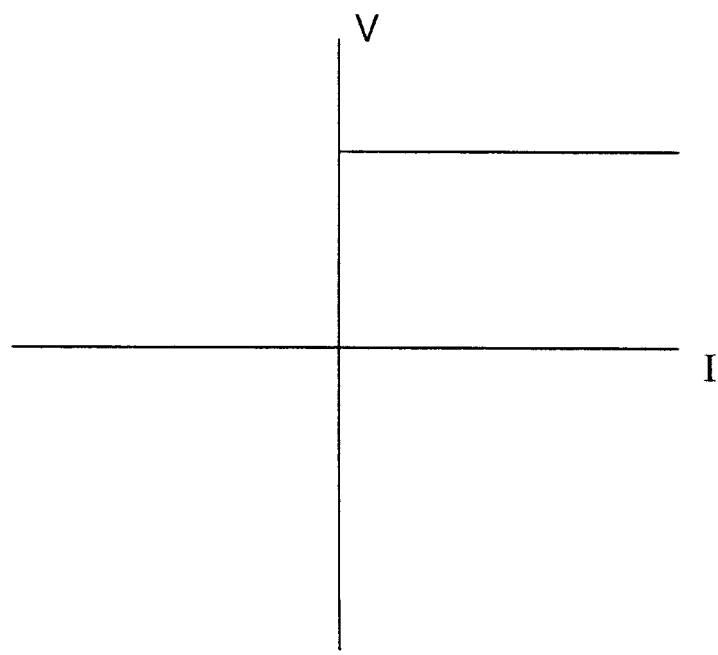
FIG. 17 is a graph of the volt-ampere characteristic of an ideal voltage-limiting means.

Significant current is conducted through the voltage limiting means 120 with a voltage drop that is independent, or only slightly dependent, on the current when a voltage level higher than a specified blocking voltage is applied to the voltage limiting means 120. Below this specified blocking voltage, no significant current is conducted through the means 120. FIG. 17 shows an idealized volt-ampere characteristic of a voltage limiting means.

Different embodiments for the voltage transient suppression circuit according to the present invention are presented in FIGS. 18A, 18B, and 20–23.

FIG. 18A shows the voltage transient suppression circuit using Zener diode as a voltage limiting means, where Zener diode is connected in parallel with snubber capacitor 116.

FIG. 18B shows the voltage transient suppression circuit using metal-oxide varistor as a voltage limiting means, where metal-oxide varistor is connected in parallel with clamp capacitor 116.

Figure 20:
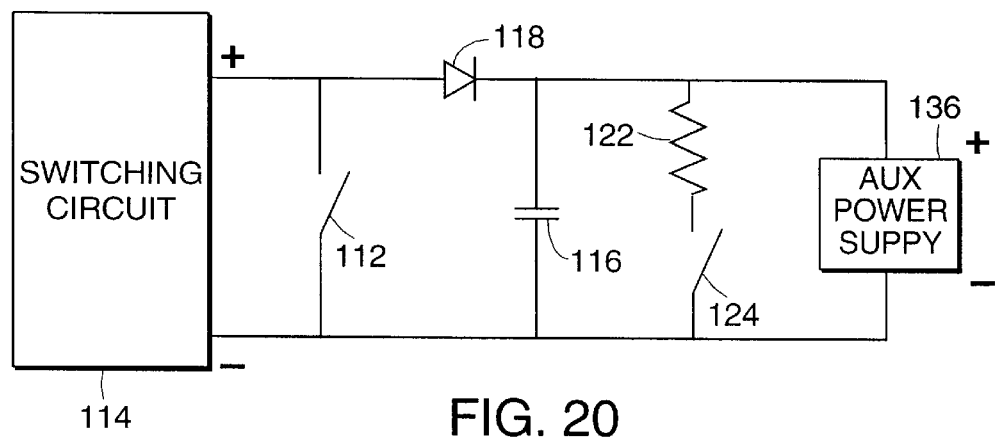
FIG. 20 is a schematic diagram of a voltage transient suppression circuit using an active resistor as a voltage-limiting means.

Referring to FIG. 20, in another embodiment, the voltage transient suppression circuit includes clamp capacitor 116 connected in parallel with switching device 112 through diode 118. The anode of diode 118 is connected to the positive terminal of switching device 112, while its cathode is connected to the positive terminal of capacitor 116. A series combination of a dissipating resistor 122 and auxiliary switch 124 is connected in parallel with capacitor 116.

Figure 21:
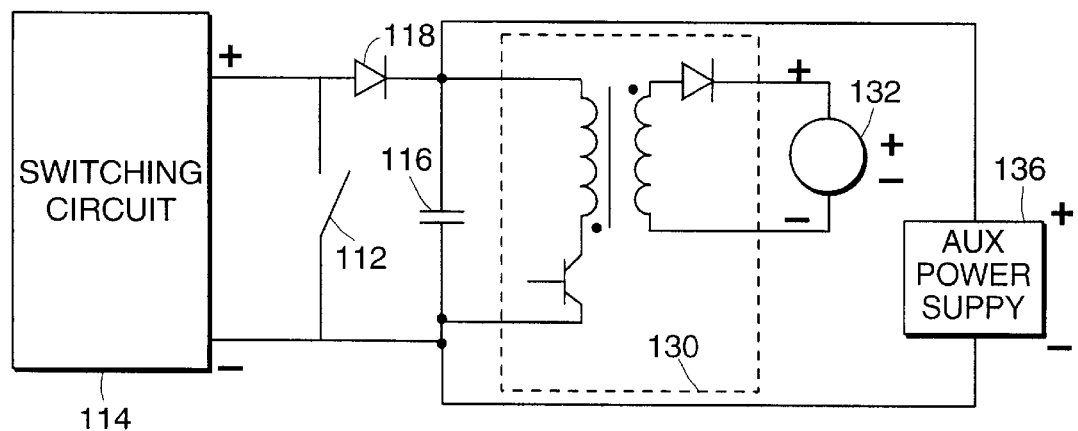
FIG. 21 is a schematic diagram of a regenerative voltage transient suppression circuit according to the invention.

FIG. 21 shows a regenerative voltage transient suppression circuit according to the invention. Voltage transient suppression circuit includes clamp capacitor 116 connected in parallel with switching device 112 through diode 118. The anode of diode 118 is connected to the positive terminal of the switching device 112, while its cathode is connected to the positive terminal of capacitor 116. An isolated DC/DC power converter 130 is connected in parallel with the capacitor 116 so that the positive input terminal of the DC/DC converter 130 is connected to the positive terminal of capacitor 116 and the negative input terminal of the DC/DC converter 130 is connected to the negative terminal of capacitor 116. Output of the DC/DC converter 130 is connected to a power supply 132. The power supply 132 is any power supply in the switching system which has enough current sinking capability to recuperate energy stored in the transient suppression circuit. FIG. 21 shows a typical flyback converter as an embodiment for the DC/DC power converter 130, but practically any type of isolated converter can be used in this circuit.

The circuits in FIGS. 16, 18A, 18B, 20 and 21 also contain an auxiliary power supply 136, connected in parallel with the capacitor 116 so that the positive terminal of the power supply 136 is connected to the positive terminal of capacitor 116 and the negative terminal of the power supply 136 is connected to the negative terminal of capacitor 116. The auxiliary power supply 136 is not always necessary; it precharges the capacitor 116 in the beginning of the working cycle to make the charging cycle of the capacitor 116 independent of switching circuit operation.

Figure 22:
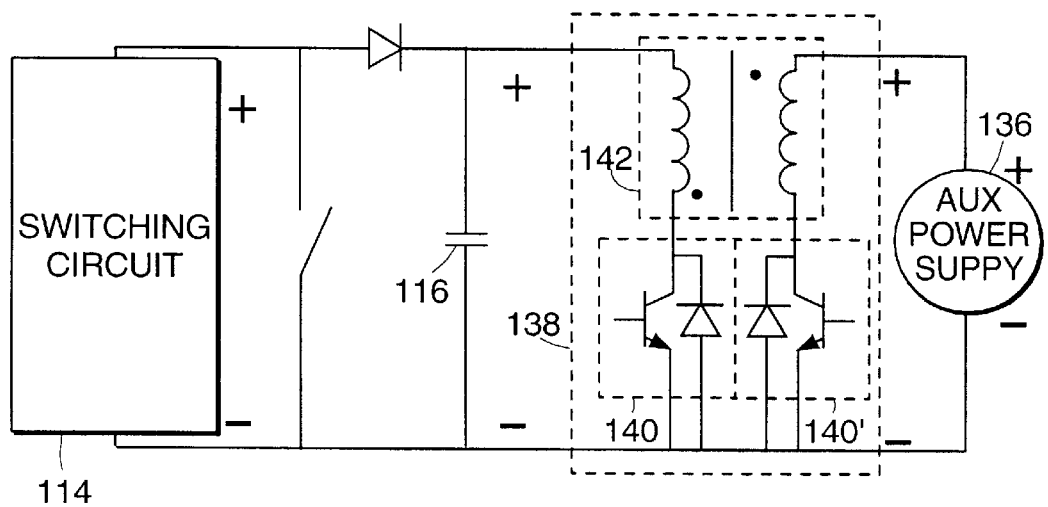
FIG. 22 is a schematic diagram of a regenerative voltage transient suppression circuit with a capacitor precharge feature, according to the invention.

FIG. 22 shows another embodiment of regenerative voltage transient suppression circuit having a capacitor precharge feature. A DC/DC power converter 138 is connected in parallel with the capacitor 116. The DC/DC converter 138 includes two inverters/rectifiers 140, 140' connected to the primary and secondary windings of an isolation transformer 142, respectively. The positive terminal of the inverter/rectifier 140 is connected to the positive terminal of the capacitor 116 and the negative terminal of the inverter/rectifier 140 is connected to the negative terminal of the capacitor 116. The positive terminal of the inverter/rectifier 140' is connected to the positive terminal of the power supply 136 and the negative terminal of the inverter/rectifier 140' is connected to the negative terminal of the power supply 136. Again, flyback converter topology is used only to illustrate the principle, but any type of isolated converter can be used in this circuit.

Figure 23:
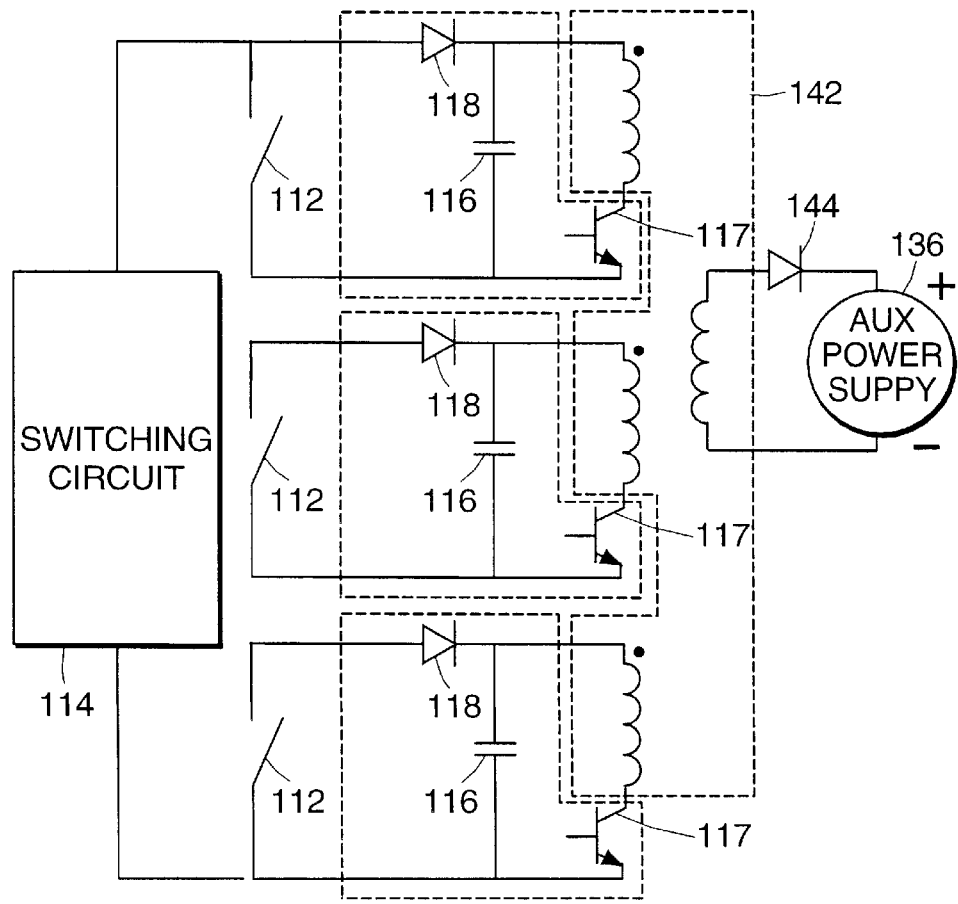
FIG. 23 is a schematic diagram of a regenerative voltage transient suppression circuit having a common isolation transformer, according to the present invention.

A regenerative voltage transient suppression circuit with a common solation transformer, shown in FIG. 23, is dedicated to be used in switching circuits with multiple switches, especially in high voltage circuits with series connected switches. A switching circuit 114 can contain any arbitrary number of switching devices 112 with their respective voltage transient suppression circuits. Each voltage transient suppression circuit includes a clamp capacitor 116 connected in parallel with a switching device 112 through a diode 118. The anode of the diode 118 is connected to the positive terminal of the switching device 112, while its cathode is connected to the positive terminal of the capacitor 116. An inverter 117 is connected in parallel with the capacitor 116 so that the positive input terminal of the inverter 117 is connected to the positive terminal of the capacitor 116 and the negative input terminal of the inverter 117 is connected to the negative terminal of the capacitor 116. The output of each inverter 117 is connected to the corresponding primary winding 116 of a common isolation transformer 142. The secondary winding of the isolation transformer 142 is connected to a power supply 136 through a rectifier 144. The power supply 136 is any power supply in the switching system which has enough current sinking capability to recuperate energy stored in the transient suppression circuits. Although the inverter 117 is shown in FIG. 23 as a flyback configuration, any other type of inverter topology can be used in this circuit.

A capacitor precharge feature can be added to the circuit in FIG. 23 by adding a rectifier to the inverter 117 and an inverter to the rectifier 144 similar to the circuit in FIG. 22 or by adding an auxiliary power supply similar to the circuit in FIG. 21.

Operation of the present invention in its typical embodiment shown in FIG. 16 is as follows.

The working cycle of the switching circuit 114 begins with the switching device 112 in an OFF (open) state. The capacitor 116 is charged through the diode 118 to the maximum operating voltage of the switching device $V_o = E_o/N$, where $E_o$ is the power source voltage of the switching circuit 114, and N is the number of series connected switches present in the switching circuit 114. The voltage limiting means 120 is selected to have a blocking voltage $V_L \geq V_o$, hence there is no significant current conducted by the voltage limiting means 120, as described above.

When the switching device 112 is turned ON (closed), the diode 118 is reverse biased, preventing the capacitor 116 from discharging through the closed switch 112. At the end of the switch ON period, energy stored by stray inductance in the switching circuit 114 is equal to $LI^2/2$, where L is the value of the stray inductance and I is the current. During the transition of the switch 112 between ON (closed) and OFF (open), the energy stored in the stray inductance tends to release in the form of a voltage spike proportional to dI/dt. After this transient voltage reaches capacitor voltage $V_c = V_o$, the diode 118 is forward biased and the capacitor 116 absorbs energy stored in stray inductance. Assuming for simplicity that voltage limiting means 120 is not involved in the transient absorption process until the end of the voltage transient and that all stored energy is absorbed by the capacitor 116, voltage stored by the capacitor 116 at the end of the voltage transient can be calculated from:

$$\frac{CV_{C1}^2}{2} - \frac{CV_0^2}{2} = \frac{LI^2}{2}, \text{ hence } V_{C1} = \sqrt{V_0^2 + \frac{L}{C}I^2}$$

As can be seen from the equation, it is possible to limit capacitor voltage, and, hence switch voltage, to any desired level for any given L and I by choosing a proper value for the capacitor 116.

When the voltage stored by the capacitor 116, $V_C$, exceeds the blocking voltage of the voltage limiting means 120, the voltage limiting means 120 starts to conduct current, which discharges the capacitor 116. This discharge process will continue until the capacitor 116 is discharged from $V_C$ to $V_O$. During this discharge, all energy absorbed by the capacitor 116 is dissipated or transferred by the voltage limiting means 120, depending on the type of voltage limiting means provided. The value of discharge current depends on the dynamic resistance of the voltage limiting means (FIG. 17). In contrast to nonlinear snubbers, the dynamic resistance of the voltage limiting means 120 and the value of discharge current determines only the discharge time and, therefore, maximum operating frequency; not the clamping voltage of the transient suppresser circuit. When the capacitor 116 voltage $V_C$ reaches the blocking voltage, $V_L$, of the voltage limiting means 120, the voltage limiting means 120 stops conducting current and the circuit is ready for the next switching cycle.

In switching circuits with series connected switches, the operating voltage of some of the switches may exceed the blocking voltage of voltage limiting means due to differences in the OFF state resistances of each switch. As soon as the switch voltage and, hence, the capacitor voltage exceeds the blocking voltage of the voltage limiting means, voltage limiting means starts to conduct, which maintains the voltage level across the capacitor and the switch $V_L$. Hence, the voltage transient suppression circuit according to the present invention also performs a voltage sharing function in switching circuits with series connected switches. Current flowing through the voltage limiting means is, in this case, fairly small since it is only a fraction of the OFF state leakage current of the switch. This is a big advantage of the circuit according to the invention compared to circuits commonly used for this purpose, such as resistive dividers, where current in a divider must be of an order of magnitude higher than OFF state leakage current of the switch in order to achieve proper voltage sharing.

Figure 1A:
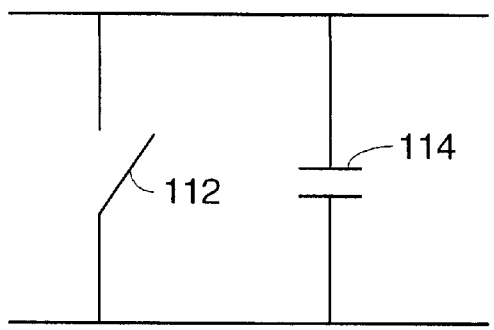
FIGS. 1A–1D are schematic diagrams of conventional capacitive snubbers.
Figure 1B:
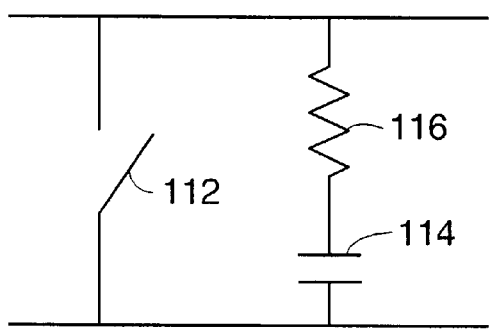
Figure 1C:
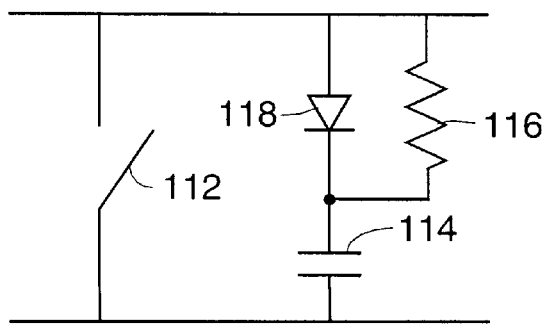
Figure 1D:
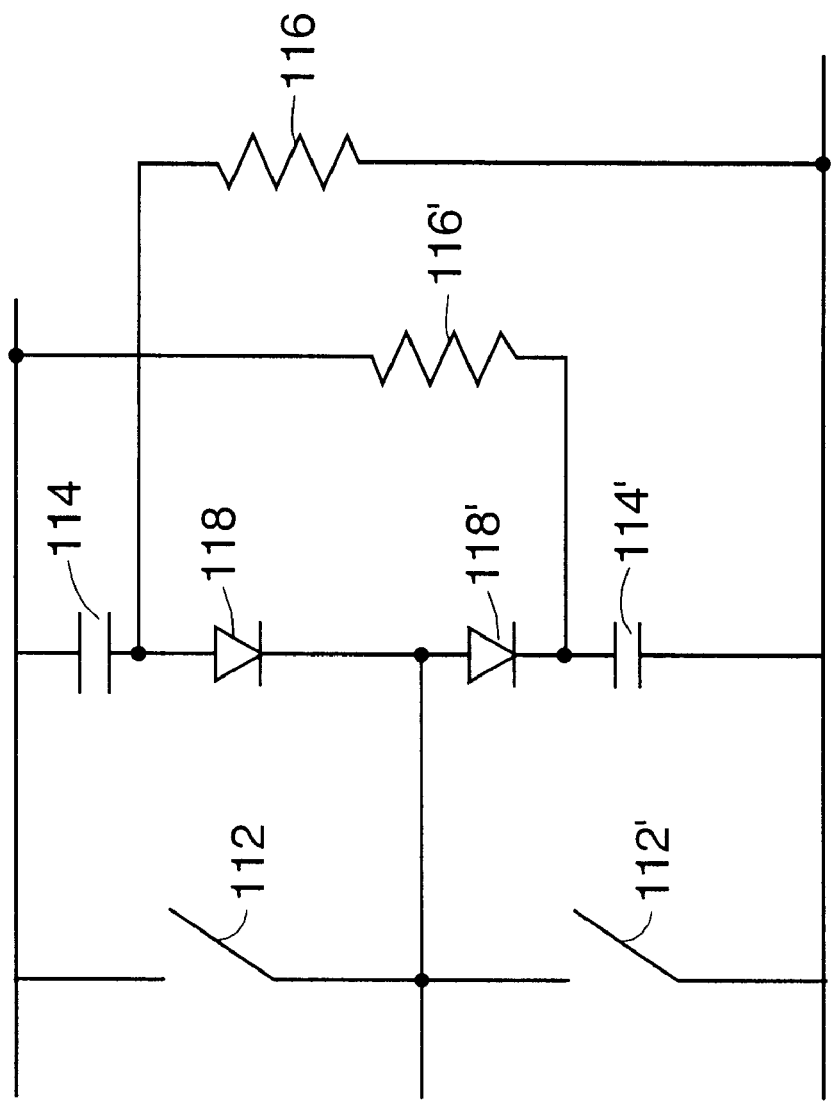
Figure 2:
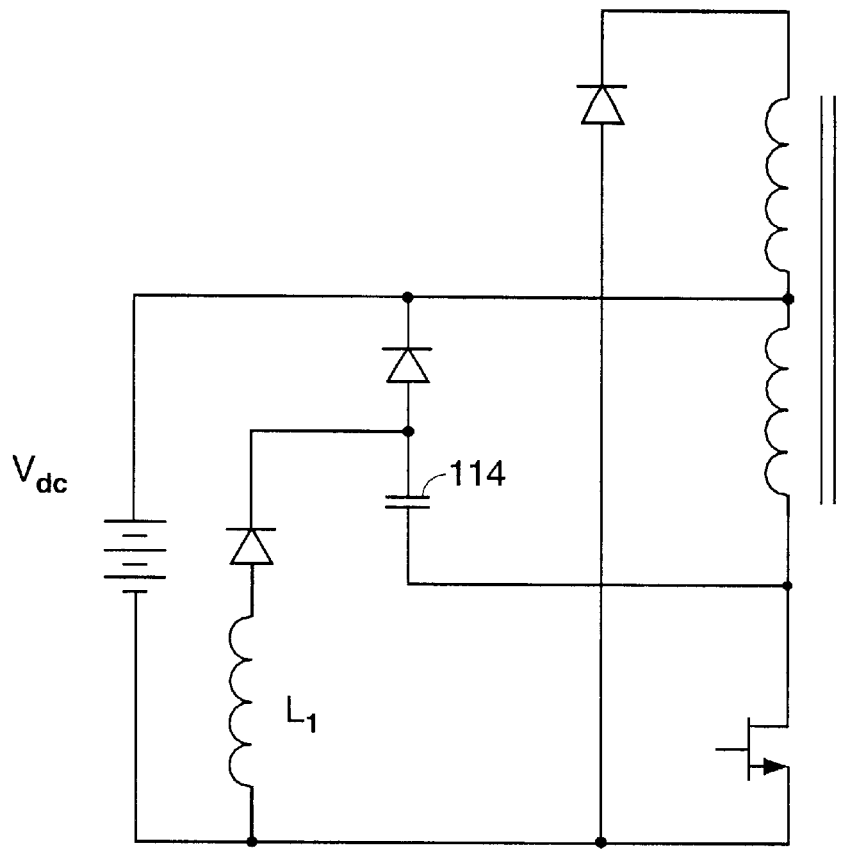
FIG. 2 is a schematic diagram of a conventional regenerative capacitive snubber.
Figure 3A:
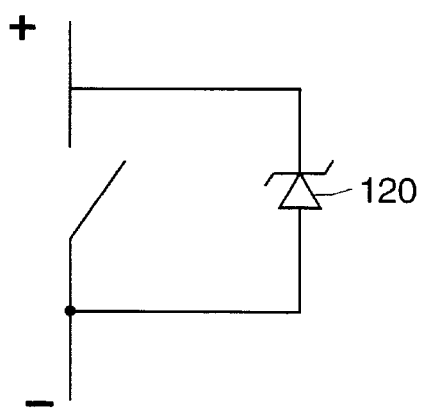
FIG. 3A is a schematic diagram of a conventional voltage transient suppression circuit using a Zener diode.
Figure 3B:
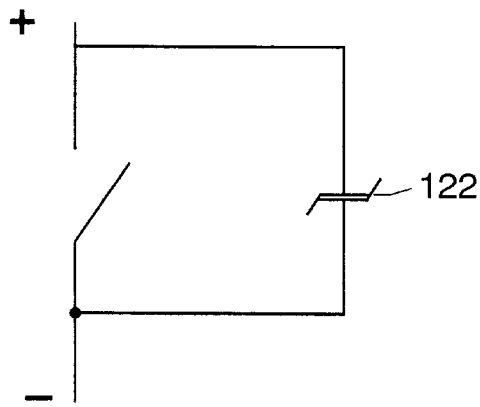
FIG. 3B is a schematic diagram of a conventional voltage transient suppression circuit using a metal-oxide varistor.
Figure 4:
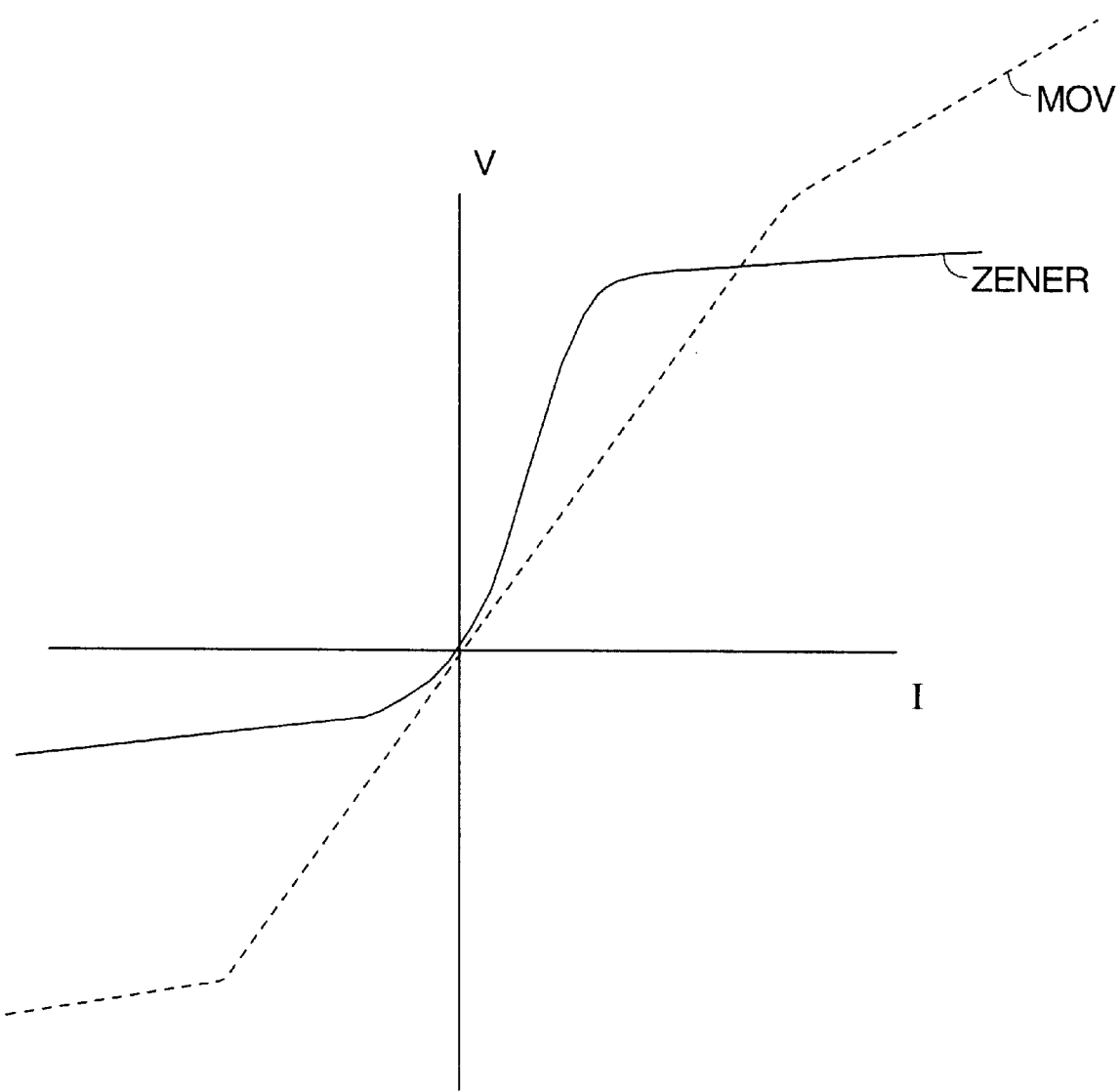
FIG. 4 is a graph showing the volt-ampere characteristics of a metal-oxide varistor and a Zener diode.

Operation of the voltage transient suppression circuits using metal-oxide varistors and Zener diodes as voltage limiting means (FIGS. 18A, 18B) closely follows the above description. FIGS. 19A and 19B show a comparison between voltage transient waveforms for a conventional voltage transient suppression circuit using metal-oxide varistors or Zener diodes (FIGS. 3A and 3B) and for voltage transient suppression circuits according to the invention, as shown in FIGS. 18A and 18B. Referring to FIG. 19A, in the conventional circuit, energy of a voltage transient is dissipated in the metal-oxide varistor or Zener diode during the transient. Due to a very high current value and relatively high dynamic resistance of the metal-oxide varistor or Zener diode, voltage across the switching device during the transient can be more than 50% higher than switching device operating voltage. This leads to increased voltage rating requirements for switching devices and thus forces an increase in the number of series connected devices in high voltage circuits. On the contrary, in voltage transient suppression circuits according to the invention, as shown in FIGS. 18A and 18B, transient overvoltage value depends not on the voltage limiting means dynamic resistance, but on the value of the capacitor 116, and is easily controllable.

Operation of the voltage transient suppression circuit shown in FIG. 20 is also similar to the described above operation of the basic circuit. Voltage limiting means is represented in this embodiment by the series combination of dissipating resistor 122 and auxiliary switch 124, connected in parallel with capacitor 116.

The working cycle of the switching circuit begins with the switching device 112 in its OFF (open) state. The capacitor 116 is charged through the diode 118 to the maximum operating voltage of the switching device $V_O$. Voltage limiting means 120 is selected to have a blocking voltage so that, when the capacitor 116 is charged to $V_O$, it does not conduct current.

When the switching device 112 is turned ON (closed), the diode 118 is reverse biased, which prevents the capacitor 116 from discharging through the closed switch 112. When the switching device 112 is turned OFF (open), energy stored in switching circuit stray inductance tends to release in the form of a voltage spike proportional to LdI/dt. After this transient voltage reaches capacitor voltage $V_C = V_O$, the diode 118 is forward biased and the capacitor 116 absorbs energy stored by stray inductance.

When capacitor voltage $V_{C1}$ exceeds the blocking voltage of voltage limiting means 120, the auxiliary switch 124 is turned ON (closed), which discharges the capacitor 116 through the dissipating resistor 122. During this discharge all energy absorbed by the capacitor 116 is dissipated in the resistor 122. When capacitor voltage $V_C$ reaches the blocking voltage ($V_L$) of the voltage limiting means, the auxiliary switch 124 is turned OFF (opened) and the circuit is ready for the next switching cycle.

Operation of the regenerative voltage transient suppression circuit shown in FIG. 21 also resembles operation of the basic circuit. Voltage limiting means 120 is represented in this embodiment by an isolated DC/DC power converter 130 connected in parallel with the capacitor 116. The output of the DC/DC converter 130 is connected to the power supply 136.

The working cycle of the switching circuit 114 begins with the switching device 112 in its OFF (open) state. The capacitor 116 is charged through the diode 118 to the maximum operating voltage of the switching device $V_o$. Voltage limiting means is selected to have a blocking voltage greater than $V_o$, hence voltage limiting means is not conducting.

When the switching device 112 is turned ON (closed), the diode 118 is reverse biased, which prevents the capacitor 116 from discharging through the closed switch 112. When the switching device 112 is turned OFF (open), energy stored in switching circuit stray inductance tends to release in the form of a voltage spike proportional to LdI/dt. After this transient voltage reaches capacitor voltage $V_C = V_O$, the diode 118 is forward biased and the capacitor 116 absorbs energy stored in stray inductance.

When capacitor voltage $V_C$, exceeds the blocking voltage of voltage limiting means, the DC/DC power converter 130 is turned ON. Energy stored in the capacitor 116 during the transient is now transferred in a lossless manner by the converter to power supply 132. Energy transfer will continue until the capacitor 116 is discharged from $V_C$ to $V_O$. When capacitor voltage $V_C$ reaches the blocking voltage of voltage limiting means, the power converter 130 is turned OFF and the circuit is ready for the next switching cycle.

Operation of the DC/DC power converter 130 during energy transfer is typical for a given converter topology and is described in detail in many sou rces. Converter topology is not limited by the shown flyback configuration. Externally controlled isolated converters such as forward, half bridge, and full bridge topologies can be used as well as self-regulated Royer oscillators and blocking oscillators.

Any power supply in the switching system which has enough current sinking capability to recuperate energy, stored in the transient suppression circuit can be used in this embodiment.

Auxiliary power supply 136, connected in parallel with capacitor 116 is optional for the transient suppression circuits shown in FIGS. 16, 18A, 18B, 20 and 21. Without this power supply, the switching circuit and the load may experience substantial current spikes caused by the time required for the clamp capacitor 116 to charge up to the operating voltage $V_o$ of the switching circuit during initial turnon. Such a current surge, even occurring only once at system turnon, may be undesirable in some applications. To avoid this, the power supply 136 precharges the capacitor 116 to the operating voltage $V_O$ of the switching device 112 prior to applying voltage to the switching circuit. Again, flyback converter topology is used for the power supply 136 only to illustrate the principal, but practically any type of isolated converter can be used in this circuit.

A voltage transient suppression circuit having regenerative and capacitor precharge features is shown in FIG. 22. A DC/DC power converter 138, connected in parallel with the capacitor 116, transfers energy in both directions. The inverter part of the inverter/rectifier 140 is turned ON prior to applying voltage to the switching circuit. The inverter/rectifier 140' transfers energy from the power supply 136 through the isolation transformer 142 and the rectifier part of the inverter/rectifier 140' precharges the capacitor 116 to the operating voltage $V_O$ of the switching circuit. After the capacitor 116 has been precharged, the inverter part of the inverter/rectifier 140' is turned OFF and the inverter part of the inverter/rectifier 140, the rectifier part of the inverter/rectifier 140', and the transformer 142 operate as a voltage limiting means, transferring energy stored in the capacitor 116 during voltage transients to power supply 136.

A regenerative voltage transient suppression circuit with a common isolation transformer, shown in FIG. 23, can be used in switching circuits having multiple switches, especially high voltage circuits with series connected switches. The switching circuit 114 includes any arbitrary number of switching devices 112 with their respective voltage transient suppression circuits. This circuit operates in the same manner as the circuit in FIG. 21 with the exception that a DC/DC converter in each of the voltage transient suppression circuits is comprised of an inverter 117, a common isolation transformer 142, and a common rectifier 144.

A capacitor precharge feature can be added to the circuit in FIG. 23 by adding a rectifier to the inverter 117 and an inverter to the rectifier 144 similar to the circuit in FIG. 22 or by adding an auxiliary power supply similar to the circuit in FIG. 21.

From the description above, it is evident that power dissipation is minimized in voltage transient suppression circuits according to the invention, because the clamp capacitor is discharged only from the voltage level of the transient overvoltage $V_c$ to the operating voltage of the switching circuit $V_o$. Also, voltage transient overvoltage value is easily controllable because it depends on the value of the clamp capacitor and not on the dynamic resistance of the voltage limiting means, as in conventional circuits.

Further, it is evident that the voltage transient suppression circuit of the present invention is independent of switching circuit topology and that power dissipation and current stresses in the switching device are reduced by excluding the switching device from the snubber capacitor charge/discharge loop. Additionally, some embodiments of the inventions can perform a voltage sharing function for switching circuits having series connected switches.

While this description is often specific, the specifics should not be viewed as limitations on the scope of the invention. The above description should only be regarded as an exemplification of embodiments of the invention. Many other variations are still possible. For example, known transient suppression circuits and techniques can be used in combination with one or more voltage transient suppression circuits or techniques according to the invention.

Figure 24:
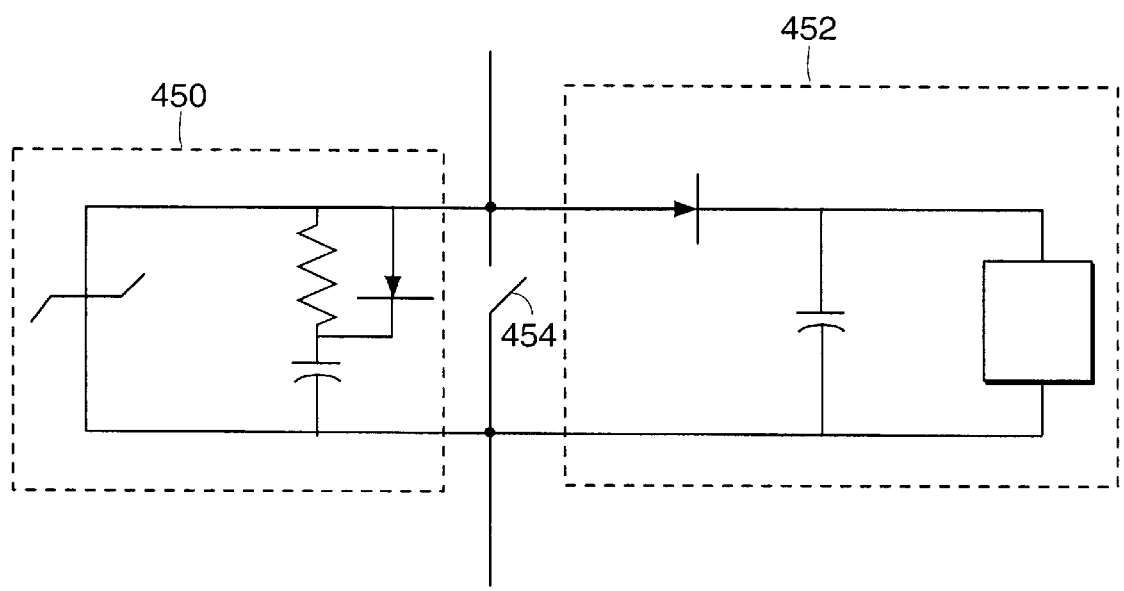
FIG. 24 is a schematic diagram of a transient suppression circuit used in combination with the voltage transient suppression circuit according to the invention.

FIG. 24 illustrates a schematic diagram of a transient suppression circuit 450 used in combination with a voltage transient suppression circuit 452 and a switching device 454 according to the invention. Also, some of the many potential uses and applications of the invention include high power solid state motor drives; modulators for medium or high power radar, plasma source ion implantation, and particle accelerator applications; amplifiers for high speed electromagnetic drives, very low frequency (VLF), or high power sonar; and megawatt RF modulators. Accordingly, the invention is to be defined not by the preceding illustrative description but instead by the spirit and scope of the following claims.

What is claimed is:

1. A voltage transient suppression circuit, comprising:
   a capacitor having a positive terminal and a negative terminal, the negative terminal for coupling to a negative terminal of a variable voltage circuit element;
   a diode having an anode and a cathode, the anode for coupling to a positive terminal of the variable voltage circuit element, the cathode connected to the positive terminal of the capacitor; and
   a voltage limiter connected in parallel with the capacitor such that: when voltage applied to the voltage limiter is above a predetermined voltage, current is allowed to conduct through the voltage limiter and a voltage potential drop across the voltage limiter is substantially independent of the current conducted therethrough; and when voltage applied to the voltage limiter is below the predetermined voltage, current is substantially prevented from passing through the voltage limiter, whereby the voltage transient suppression circuit protects the variable voltage circuit element from transients.

2. The circuit of claim 1 further comprising the variable voltage circuit element which comprises a switching device, wherein: with the switching device open, voltage across the capacitor and across the switching device is substantially equal to the predetermined voltage; and with the switching device closed, the diode is reverse biased, voltage across the switching device is substantially zero, and voltage across the capacitor is substantially equal to the predetermined voltage.

3. The circuit of claim 1 further comprising the variable voltage circuit element which comprises a series impedance.

4. The circuit of claim 1 further comprising the variable voltage circuit element which comprises a load.

5. The circuit of claim 1 wherein the voltage limiter comprises a metal-oxide varistor.

6. The circuit of claim 1 wherein the volt age limiter comprises a Zener diode.

7. The circuit of claim 1 wherein the voltage limiter comprises an active resistor.

8. The circuit of claim 7 wherein the active resistor comprises a series combination of a dissipating resistor and a switching device such that: when voltage applied to the series combination is above the predetermined voltage, the switching device is closed; and when voltage applied to the series combination is below the predetermined voltage, the switching device is open.

9. The circuit of claim 1 wherein the voltage limiter comprises an isolated DC/DC power converter having a positive input terminal, a negative input terminal, and output terminals, the isolated DC/DC power converter connected in parallel with the capacitor such that the positive input terminal of the isolated DC/DC power converter is connected to the positive terminal of the capacitor and the negative input terminal of the isolated DC/DC power converter is connected to the negative terminal of the capacitor.

10. The circuit of claim 1 further comprising:

a DC power supply having a positive output terminal, a negative output terminal, and output voltage equal to or less than the predetermined voltage, the DC power supply connected in parallel with the capacitor such that: the positive output terminal of the DC power supply is connected to the positive terminal of the capacitor and the negative output terminal of the DC power supply is connected to the negative terminal of the capacitor.

11. The circuit of claim 5 further comprising:

a DC power supply having a positive output terminal, a negative output terminal, and output voltage equal to or less than the predetermined voltage, the DC power supply connected in parallel with the capacitor such that: the positive output terminal of the DC power supply is connected to the positive terminal of the capacitor and the negative output terminal of the DC power supply is connected to the negative terminal of the capacitor.

12. The circuit of of claim 6 further comprising:

a DC power supply having a positive output terminal, a negative output terminal, and output voltage equal to or less than the predetermined voltage, the DC power supply connected in parallel with the capacitor such that: the positive output terminal of the DC power supply is connected to the positive terminal of the capacitor and the negative output terminal of the DC power supply is connected to the negative terminal of the capacitor.

13. The circuit of claim 7 further comprising:

a DC power supply having a positive output terminal, a negative output terminal, and output voltage equal to or less than the predetermined voltage, the DC power supply connected in parallel with the capacitor such that: the positive output terminal of the DC power supply is connected to the positive terminal of the capacitor and the negative output terminal of the DC power supply is connected to the negative terminal of the capacitor.

14. The circuit of claim 8 further comprising:

a DC power supply having a positive output terminal, a negative output terminal, and output voltage equal to or less than the predetermined voltage, the DC power supply connected in parallel with the capacitor such that: the positive output terminal of the DC power supply is connected to the positive terminal of the capacitor and the negative output terminal of the DC power supply is connected to the negative terminal of the capacitor.

15. The circuit of claim 9 further comprising:

a DC power supply having a positive output terminal, a negative output terminal, and output voltage equal to or less than the predetermined voltage, the DC power supply connected in parallel with the capacitor such that: the positive output terminal of the DC power supply is connected to the positive terminal of the capacitor and the negative output terminal of the DC power supply is connected to the negative terminal of the capacitor.

16. The circuit of claim 1 wherein the voltage limiter comprises:

a transformer with a plurality of primary windings and a secondary winding;

a DC power supply;

a rectifier having a plurality of AC terminals and DC terminals, the AC terminals connected to the secondary winding of the transformer, the DC terminals of the rectifier connected to the DC power supply; and a DC/AC converter having a positive input terminal, a negative input terminal, and output terminals, the DC/AC converter connected in parallel with the capacitor such that the positive input terminal of the DC/AC converter is connected to the positive terminal of the capacitor and the negative input terminal of the DC/AC converter is connected to the negative terminal of the capacitor, the output terminals of the DC/AC converter are connected to any one of the plurality of primary windings of the transformer.

17. The circuit of claim 16 further comprising:

an additional DC power supply having a positive output terminal, a negative output terminal, and output voltage equal to or less than the predetermined voltage, the additional DC power supply connected in parallel with the capacitor such that: the positive output terminal of the additional DC power supply is connected to the positive terminal of the snubber capacitance and the negative output terminal of the additional DC power supply is connected to the negative terminal of the capacitor.

18. The circuit of claim 1 wherein the voltage limiter comprises:

a DC power supply;

an isolation transformer having a primary winding and a secondary winding;

a first two-quadrant DC/AC converter having a positive terminal, a negative terminal, a plurality of AC terminals, the first two-quadrant DC/AC converter connected in parallel with the capacitor such that the positive terminal of the first two-quadrant DC/AC converter is connected to the positive terminal of the capacitor and the negative terminal of the DC/AC converter is connected to the negative terminal of the capacitor, the plurality of AC terminals of the first two-quadrant DC/AC converter connected to the primary winding of the isolation transformer; and a second two-quadrant DC/AC converter having a plurality of AC terminals, and a plurality of DC terminals, the plurality of the AC terminals of the second two-quadrant DC/AC converter connected to the secondary winding of the isolation transformer and the plurality of the DC terminals of the second two-quadrant DC/AC converter connected to the DC power supply;

wherein, prior to applying power to the variable voltage circuit element, the first and second two-quadrant DC/AC converters transfer energy from the DC power supply to the capacitor with the voltage on the DC terminals of the first two-quadrant DC/AC converter being equal to or less than the predetermined voltage, and, after applying power to the variable voltage circuit element, the first and second two-quadrant DC/AC converters transfer energy from the capacitor to the DC power supply with the voltage on the DC terminals of the first two-quadrant DC/AC converter being substantially equal to the predetermined voltage.

19. The circuit of claim 1 wherein the voltage limiter comprises:

a DC power supply;

an isolation transformer with a plurality of primary windings and a secondary winding;

a first two-quadrant DC/AC converter including positive terminal, negative terminal, a plurality of AC terminals, and an inverter having a positive terminal and a negative terminal, the first two-quadrant DC/AC converter connected in parallel with the capacitor such that the positive terminal of the inverter is connected to the positive terminal of the capacitor and the negative terminal of the inverter is connected to the negative terminal of the capacitor, the AC terminals of the first two-quadrant DC/AC converter connected to any one of the plurality of primary windings of the isolation transformer, the others of the plurality of primary windings of the isolation transformer for coupling to AC terminals of other two-quadrant DC/AC converters in other voltage transient suppression circuits; and a second two-quadrant DC/AC converter including a plurality of AC terminals and a plurality of DC terminals, the AC terminals of the second two-quadrant DC/AC converter connected to the secondary winding of the isolation transformer and the DC terminals of the second two-quadrant DC/AC converter connected to the DC power supply;

wherein, prior to applying power to the variable voltage circuit element, the first and second two-quadrant DC/AC converters transfer energy from the DC power supply to the capacitor with the voltage on the DC terminals of the first two-quadrant DC/AC converter being equal to or less than the predetermined voltage, and, after applying power to the variable voltage circuit element, the first and second two-quadrant DC/AC converters transfer energy from the capacitor to the DC power supply with the voltage on the DC terminals of the first two-quadrant DC/AC converter being substantially equal to the predetermined voltage.

20. The circuit of claim 1 further comprising:

a parallel combination of a snubber circuit and a voltage limiter electrically connected in parallel to the voltage transient suppression circuit.

* * * * *